United States Patent
Liu et al.

(10) Patent No.: US 12,555,767 B2
(45) Date of Patent: Feb. 17, 2026

(54) METHODS FOR THE CONTROLLED SYNTHESIS OF LAYERED LITHIUM AND SODIUM TRANSITION METAL OXIDES USING ELECTROCHEMICALLY ASSISTED ION-EXCHANGE

(71) Applicant: THE UNIVERSITY OF CHICAGO, Chicago, IL (US)

(72) Inventors: Chong Liu, Chicago, IL (US); Yu Han, Chicago, IL (US)

(73) Assignee: The University of Chicago, Chicago, IL (US)

(*) Notice: Subject to any disclaimer, the term of this patent is extended or adjusted under 35 U.S.C. 154(b) by 496 days.

(21) Appl. No.: 18/176,857

(22) Filed: Mar. 1, 2023

(65) Prior Publication Data

US 2023/0282800 A1 Sep. 7, 2023

Related U.S. Application Data

(60) Provisional application No. 63/315,698, filed on Mar. 2, 2022.

(51) Int. Cl.
*H01M 4/04* (2006.01)
*H01M 4/505* (2010.01)
(Continued)

(52) U.S. Cl.
CPC ......... *H01M 4/0459* (2013.01); *H01M 4/505* (2013.01); *H01M 4/525* (2013.01); *H01M 10/052* (2013.01)

(58) Field of Classification Search
CPC .... H01M 4/0459; H01M 4/505; H01M 4/525; C01D 1/20
See application file for complete search history.

(56) References Cited

U.S. PATENT DOCUMENTS

| 9,331,274 B2 | 5/2016 | Moradpour et al. |
| 2019/0148711 A1 | 5/2019 | Jo et al. |

(Continued)

FOREIGN PATENT DOCUMENTS

| JP | 2013/546195 A | 12/2013 |
| WO | WO 2020/069618 A1 | 4/2020 |

OTHER PUBLICATIONS

Carlier, D. et al. On the metastable O2-type LiCoO2. Solid State Ionics. 144, 263-276 (Year: 2001).*

(Continued)

*Primary Examiner* — Marla D Mcconnell
*Assistant Examiner* — Julia S Caserto
(74) *Attorney, Agent, or Firm* — Bell & Manning, LLC

(57) ABSTRACT

Methods for synthesizing layered lithium transition metal oxides from layered sodium transition metal oxides are provided. Also provided are electrodes for lithium-ion batteries that include the layered lithium transition metal oxides. Similarly, methods for the synthesis of layered sodium transition metal oxides from layered lithium transition metal oxides and electrodes for sodium-ion batteries that include the layered sodium transition metal oxides are provided. The methods couple electrochemical intercalation of alkali ions (Li$^+$ or Na$^+$) with ion-exchange to overcome the kinetic limitation of ion-exchange in the layered alkali transition metal oxides at low vacancy concentrations.

16 Claims, 20 Drawing Sheets

(51) Int. Cl.
H01M 4/525 (2010.01)
H01M 10/052 (2010.01)

(56) References Cited

U.S. PATENT DOCUMENTS

2021/0119199 A1* 4/2021 Sugiyama .............. H01M 4/525
2023/0323552 A1* 10/2023 Liu ........................... C25C 1/02
205/560

OTHER PUBLICATIONS

Hill, G.T et al. Layer spacing gradient (NaLi) 1-xCoO2 for electrochemical Li extraction. Matter. 4, 1611-1624 (Year: 2021).*
Mo, Y. Insights into Diffusion Mechanisms in P2 Layered Oxide Materials by First Principles Calculations. Chemistry of Materials. 26, 18, 5208-5214 (Year: 2014).*
Motohashi, T. et al. Electronic phase diagram of layered cobalt oxide system LixCoO2 (0.05≤x≤1.0). Physical Review B. 80, 165114 (Year: 2009).*
Tournadre, F. et al. On the mechanism of the P2—Na0.70CoO2—O2—LiCoO2 exchange reaction-Part I: proposition of a model to describe the P2—O2 transition. Journal of Solid State Chemistry. 177, 2790-2802 (Year: 2004).*
Delmas, C., Braconnier, J.-J. & Hagenmuller, P., "A new variety of LiCoO2 with an unusual oxygen packing obtained by exchange reaction," Mater. Res. Bull. 17, 117-123 (1982).
Carlier, D. et al., "On the metastable O2-type LiCoO2," Solid State Ion. 144, 263-276 (2001).
Tournadre, F et al., "On the mechanism of the P2—Na0.70CoO2→O2—LiCoO2 exchange reaction—Part I: proposition of a model to describe the P2—O2 transition," J. Solid State Chem. 177, 2790-2802 (2004).
Tournadre, F., Croguennec, L., Willmann, P. & Delmas, C., "On the mechanism of the P2—Na0.70CoO2→O2—LiCoO2 exchange reaction—Part II: an in situ X-ray diffraction study," J. Solid State Chem. 177, 2803-2809 (2004).
Capitaine, F., Gravereau, P. & Delmas, C., "A new variety of LiMnO2 with a layered structure," Solid State Ion. 89, 197-202 (1996).
Armstrong, A. R. & Bruce, P. G.," Synthesis of layered LiMnO2 as an electrode for rechargeable lithium batteries," Nature 381, 499-500 (Jun. 6, 1996).
Paulsen, J. M., Donaberger, R. A. & Dahn, J. R., "Layered T2-, O6-, O2-, and P2-Type A2/3[M'2+1/3M4+2/3]O2 Bronzes, A=Li, Na; M'=Ni, Mg; M=Mn, Ti," Chem. Mater. 12, 2257-2267 (2000).
Paulsen, J. M. & Dahn, J. R., O 2-Type Li2 / 3 [ Ni1 / 3Mn2 / 3 ] O 2: A New Layered Cathode Material for Rechargeable Lithium Batteries II. Structure, Composition, and Properties, J. Electrochem. Soc. 147, 2478-2485 (2000).
Paulsen, J. M., Thomas, C. L. & Dahn, J. R.,"Layered Li-Mn-Oxide with the O2 Structure: A Cathode Material for Li-Ion Cells Which Does Not Convert to Spinel," J. Electrochem. Soc. 146, 3560-3565 (1999).
Paulsen, J. M. & Dahn, J. R., "Studies of the layered manganese bronzes, Na2/3[Mn1—xMx]O2 with M=Co, Ni, Li, and Li2/3[Mn1—xMx]O2 prepared by ion-exchange,". Solid State Ion. 126, 3-24 (1999).
Paulsen, J. M., Larcher, D. & Dahn, J. R., "O2 Structure Li2/3[Ni1/3Mn2/3]O2: A New Layered Cathode Material for Rechargeable Lithium Batteries III. Ion Exchange," J. Electrochem. Soc., 147 (8) 2862-2867 (2000).
Lu, Z., Donaberger, R. A., Thomas, C. L. & Dahn, J. R., "T2 and O2 Li2 / 3 [ CoxNi1 / 3—x / 2Mn2 / 3—x / 2 ] O 2 Electrode Materials," J. Electrochem. Soc. 149, A1083 (2002).
Lu, Z. & Dahn, J. R., "The Effect of Co Substitution for Ni on the Structure and Electrochemical Behavior of T2 and O2 Structure Li2 / 3 [ Co x Ni1 / 3—x Mn2 / 3 ] O 2," J. Electrochem. Soc. 148, A237 (2001).

Lu, Z. & Dahn, J. R., "Effects of Stacking Fault Defects on the X-ray Diffraction Patterns of T2, O2, and O6 Structure Li2/3[CoxNi1/3—xMn2/3]O2," Chem. Mater. 13, 2078-2083 (2001).
Kang, K., Meng, Y. S., Bréger, J., Grey, C. P. & Ceder, G., "Electrodes with High Power and High Capacity for Rechargeable Lithium Batteries," Science 311, 977-980 (2006).
Kim, J. et al., "Alluaudite LiMnPO 4: a new Mn-based positive electrode for Li rechargeable batteries," J. Mater. Chem. A 2, 8632-8636 (2014).
Kim, J. et al., "LiFePO 4 with an alluaudite crystal structure for lithium ion batteries," Energy Environ. Sci. 6, 830-834 (2013).
Hua, W. et al., "Li+/Na+ Ion Exchange in Layered Na2/3(Ni0.25Mn0.75)O2: A Simple and Fast Way to Synthesize O3/O2-Type Layered Oxides," Chem. Mater. 33, 5606-5617 (2021).
J. M. Paulsen et al., "O2 Structure Li2/3{Ni1/3Mn2/3}O2: A New Layered Cathode Material for Rechargeable Lithium Batteries I. Electrochemical Properties," Journal of the Electrochemical Society, 147 (3) 861-868 (2000).
R. Berthelot et al., "Synthesis and Investigations on an O4—LiCoO2 Polytype," Electrochemical and Solid-State Letters, 12 (11) A207-A210 (2009).
Hill et al., "Layer spacing gradient (NaLi)1—xCoO2 for electrochemical Li extraction," Matter 4, 1-14 (May 5, 2021).
Merryweather et al., "Operando optical tracking of single-particle ion dynamics and phase transitions in battery electrodes," arXiv preprint arXiv:2011.10537 (2020); pp. 1-18.
Li et al., Hydrothermal synthesis of uniform nanosized lithium-rich cathode material Li0.94[Li0.14Ni0.26Mn0.60]O2 for high power lithium-ion batteries, Micro & Nano Letters, vol. 9, Iss. 1, 2014; pp. 19-23.
Liu et al., "Lithium Extraction from Seawater through Pulsed Electrochemical Intercalation," Joule (Jul. 15, 2020) 4; pp. 1-11.
Zavahr et al., "A review on lithium recovery using electrochemical capturing systems," Desalination 500 (2021) 114883.
Mendiboure, A., C. Delmas, and P. Hagenmuller., "New layered structure obtained by electrochemical deintercalation of the metastable LiCoO2 (O2) variety," Materials research bulletin 19.10 (1984): 1383-1392.
Heubner, Christian, et al. "Insights into the electrochemical Li/Na-exchange in layered LiCoO2 cathode material," Energy Storage Materials 27 (2020): 377-386.
Xiao, Biwei, et al., "Revealing the atomic origin of heterogeneous Li-ion diffusion by probing Na," Advanced Materials 31.29 (2019): 1805889.
Kanoh, Hirofumi, et al., "Selective electroinsertion of lithium ions into a platinum/. lambda.-manganese dioxide electrode in the aqueous phase," Langmuir 7.9 (1991): 1841-1842.
Trócoli, Rafael, Collins Erinmwingbovo, and Fabio La Mantia., "Optimized Lithium Recovery from Brines by using an Electrochemical Ion-Pumping Process Based on λ-MnO2 and Nickel Hexacyanoferrate," ChemElectroChem 4.1 (2017): 143-149.
Lawagon, Chosel P., et al., "Li1—xNi0. 33Co1/3Mn1/3O2/Ag for electrochemical lithium recovery from brine," Chemical Engineering Journal 348 (2018): 1000-1011.
Mizushima, K. J. P. C., et al., "LixCoO2 (0< x <-1): A new cathode material for batteries of high energy density," Materials Research Bulletin 15.6 (1980): 783-789.
Alberto Battistel et al., "Electrochemical Methods for Lithium Recovery: A Comprehensive and Critical Review," Adv. Mater. 2020, 32, 1905440 (1-23).
R. Berthelot et al., "Electrochemical investigation of the P2—NaxCoO2 phase diagram," Nature Materials, vol. 10, Jan. 2011; pp. 74-80.
Luo et al., "Raising the cycling stability of aqueous lithium-ion batteries by eliminating oxygen in the electrolyte," Nature Chemistry, vol. 2, Sep. 2010; pp. 760-765.
Shyue Ping Ong et al., "Voltage, stability and diffusion barrier differences between sodium-ion and lithium-ion intercalation materials," Energy Environ. Sci., 2011, 4, 3680-3688.
Mauro Pasta et al., "Batteries for lithium recovery from brines†," Energy Environ. Sci., 2012, 5, 9487-9491.
Jan N. Reimers et al., "Electrochemical and In Situ X-Ray Diffraction Studies of Lithium Intercalation in LixCoO2," Journal of The Electrochemical Society 1992, vol. 139, Issue 8; pp. 2091-2097.

(56) References Cited

OTHER PUBLICATIONS

Riccardo Ruffo et al., "Electrochemical behavior of LiCoO2 as aqueous lithium-ion battery electrodes," *Electrochemistry Communications* 11 (2009); pp. 247-249.

A. Van der Ven et al., "Lithium diffusion mechanisms in layered intercalation compounds," *Journal of Power Sources* 97-98 (2001); pp. 529-531.

Sixie Yang et al., "Lithium Metal Extraction from Seawater," *Joule* 2, 1648-1651, Sep. 19, 2018.

\* cited by examiner

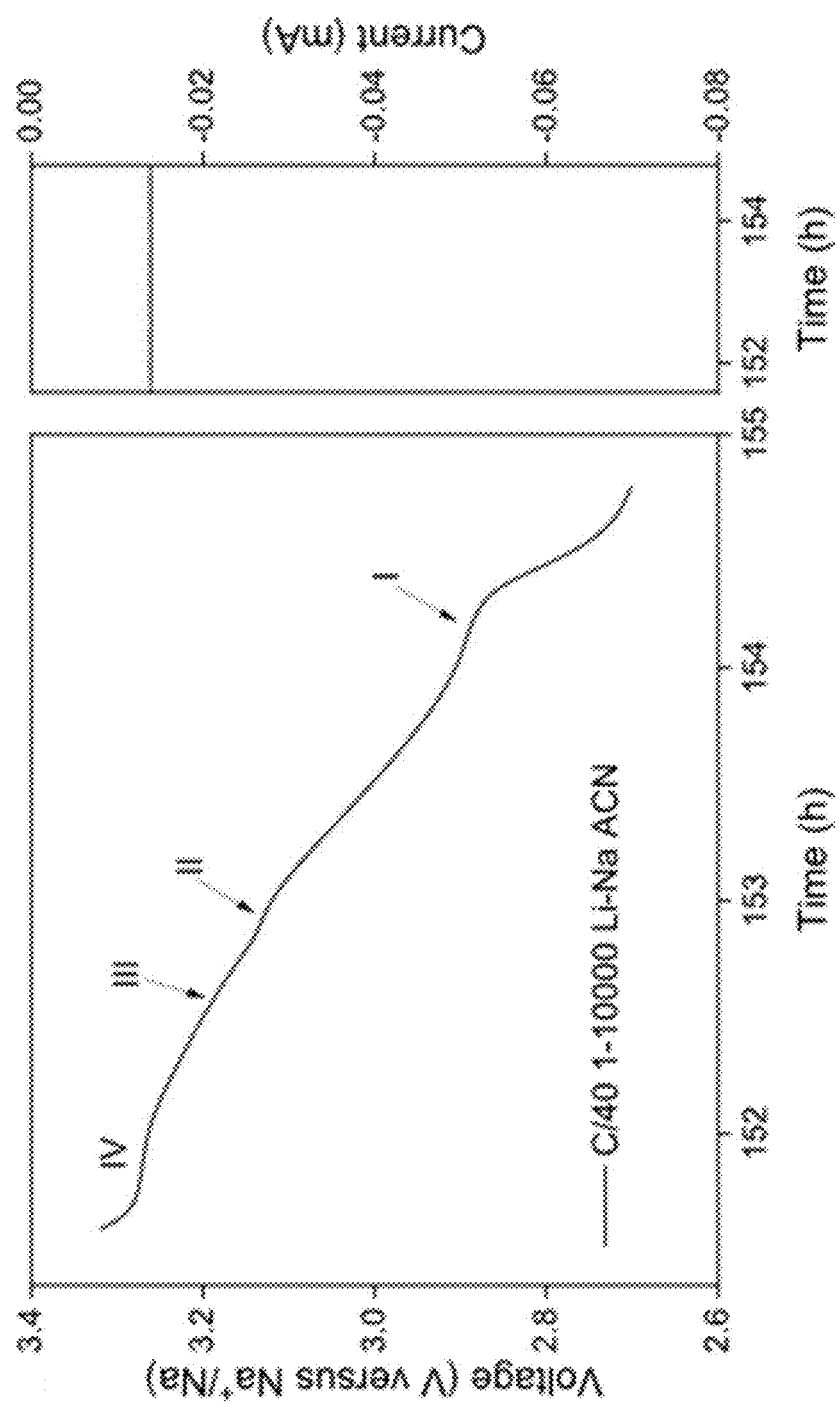

METHODS FOR THE CONTROLLED SYNTHESIS OF LAYERED LITHIUM AND SODIUM TRANSITION METAL OXIDES USING ELECTROCHEMICALLY ASSISTED ION-EXCHANGE

CROSS REFERENCE TO RELATED APPLICATIONS

The present application claims priority to U.S. provisional patent application No. 63/315,698 that was filed Mar. 2, 2022, the entire contents of which are incorporated herein by reference.

BACKGROUND

Ion-exchange has been used in the battery field to prepare cathode materials having meta-stable structures for lithium-ion and sodium-ion batteries. Ion exchange is a process, usually conducted under relatively mild temperature conditions, involving exchanging ions in a solid material with other ions in surrounding liquid components, solutions, or molten salts, in which the "backbone" framework of the solid materials will be crystallographically preserved. Ion exchange is a facile and dedicated soft-chemical process for the synthesis of materials that cannot be directly achieved by a direct synthesis route. Thus, ion exchange is widely used in the battery field to prepare novel cathode materials. O2-$LiCoO_2$, layered $LiMnO_2$, A-$Li_{2/3}MO_2$ (A=O2, T2, O6, M represents combinations of Li, Co, Mg, Mn, Ni, Ti), $LiNi_{0.5}Mn_{0.5}O_2$ with fewer Ni/Li exchanges, and alluaudite $LiMPO_4$ (M=Fe, Mn) are examples of materials that have been made using ion-exchange.

Synthesizing cathode materials via ion-exchange process is typically conducted using a trial-and-error approach. Usually, however, one cannot ascertain the chemical compositions of exchanged products without direct measurements, nor can one ascertain whether the parent phase still remains in the products. Moreover, previous ion-exchange studies usually exchanged the as-synthesized starting materials, such as $Na_{2/3}MO_2$, and $NaMO_2$ (M represents transition metal), in which the effect of vacancy on the ion-exchange process was neglected.

SUMMARY

Methods for synthesizing layered lithium transition metal oxides from layered sodium transition metal oxides are provided. Also provided are electrodes for lithium-ion batteries that include the layered lithium transition metal oxides. Further provided are methods for the synthesis of layered sodium transition metal oxides from layered lithium transition metal oxides and electrodes for sodium-ion batteries that include the layered sodium transition metal oxides.

One embodiment of a method for synthesizing a layered oxide having the formula $Li_xNa_yMO_2$, where $0<x<1$ and $0<y<1$ and M is Co, Mn, or Ni, includes the steps of: (a) providing a layered cobalt metal oxide having the formula $Na_yMO_2$, where $0.57 \le y \le 0.67$; (b) conducting a first cation-exchange on the $Na_yMO_2$, where $0.57 \le y \le 0.67$, in a solution containing dissolved lithium ions to convert the $Na_yMO_2$, where $0.57 \le y \le 0.67$, into a material comprising discrete phases of $Li_{0.94}MO_2$ and $Na_yMO_2$, where $0.45<y<0.51$; (c) conducting an electrochemical intercalation of lithium ions into the material to increase the $Li_{0.94}MO_2$ fraction in the material and regenerate $Na_yMO_2$, where $0.57 \le y \le 0.67$; and (d) conducting an additional cation-exchange on the material in the solution containing dissolved lithium ions material to increase the $Li_{0.94}MO_2$ fraction in the material and convert the $Na_yMO_2$, where $0.57 \le y \le 0.67$, back into $Na_yMO_2$, where $0.45<y<0.51$.

One embodiment of an electrode for a lithium ion battery comprises a material comprising discrete $Li_{0.94}MO_2$ and $Na_yMO_2$ phases, where $0.45<y<0.51$, wherein the phase fraction of $Li_{0.94}MO_2$ in the material is at least 90 mol. %.

One embodiment of a method for synthesizing a layered oxide having the structure $Na_yMO_2$, where $0.45<y<0.51$ and M is Co, Mn, or Ni, includes the steps of: (a) providing a layered cobalt metal oxide having the structure $LiMO_2$; (b) conducting an electrochemical deintercalation of lithium ions from the material to convert the $LiMO_2$ into $Li_{0.4}MO_2$; and (c) conducting a cation-exchange on the $Li_{0.4}MO_2$ in a solution containing dissolved sodium ions to convert the $Li_{0.4}MO_2$ into a material comprising $Na_yMO_2$ phases, where $0.45<y<0.51$, wherein the phase fraction of $Na_yMO_2$ in the material is at least 0.98 mol. %.

One embodiment of electrode for a sodium ion battery comprises a material comprising $Na_yMO_2$ phases, where $0.45<y<0.51$, wherein the phase fraction of $Na_yMO_2$ in the material is at least 0.98 mol. %.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 1A shows galvanostatic curves of P3-$Na_yCoO_2$ in the range of $0.37<y<0.92$ and $Li_xCoO_2$ in the range of $0.37<x<1.0$ at C/80. FIG. 1B shows open-circuit voltage (OCV) curves of P3-$Na_yCoO_2$ (y=0.37, 0.47, 0.57, 0.67, 0.77, 0.87) during ion exchange. Inset: enlarged OCV curve of $Na_{0.67}CoO_2$ showing the "pseudo-charging" behavior with four characteristic plateaus. FIG. 1C shows synchrotron X-ray diffraction patterns of $Na_yCoO_2$ (y=0.37, 0.57, 0.67, 0.87) before and after 24 h ion exchange. Gray dash lines indicate the (003) peak positions of equilibrated phases $Na_{0.48}CoO_2$ (left) and $Li_{0.94}CoO_2$ (right). $Na_{0.57}CoO_2$ and $Na_{0.67}CoO_2$ which showed phase equilibrium behaviors are highlighted. FIG. 1D shows chemical compositions of $Li_aNa_bCoO_2$. Black dots and white dots are the Li contents and Na contents measured after 24 h and 15 d (labeled by the arrows) ion exchange, respectively, for $Na_yCoO_2$ (y=0.37, 0.47, 0.57, 0.67, 0.72, 0.77, 0.87). The dash lines are predicted Li and Na contents based on phase equilibrium. FIG. 1E shows Rietveld refinements of patterns in FIG. 1C: $Na_{0.67}CoO_2$ (top) after 24 h ion exchange with 39.7% $Li_{0.94}CoO_2$ and 60.3% $Na_{0.48}CoO_2$ and $Na_{0.57}CoO_2$ (bottom) after 24 h ion exchange with 17.9% $Li_{0.94}CoO_2$ and 82.1% $Na_{0.48}CoO_2$.

FIG. 2A shows a HAADF-STEM image, EDS maps, and Li EELS map of $Na_{0.67}CoO_2$ after reaching equilibrium. Na locates in the center and Li locates at the edges and corners of the particle. Scale bar, 30 nm. FIG. 2B shows synchrotron X-ray diffraction patterns of different intermediate states. Gray dash lines indicate the (003) peak positions of equilibrated phases $Na_{0.48}CoO_2$ (left) and $Li_{0.94}CoO_2$ (right). FIG. 2C shows Lithium contents (measured (dots) and calculated (line) based on evolution equation) as a function of Na phase during ion exchange. FIG. 2D shows OCV curves of $Na_{0.67}CoO_2$ ion exchanging in ACN solutions with different Li—Na ratios. The curve of 1 M Li is overlapping with the curve of 1-1 Li—Na. FIG. 2E shows in-situ synchrotron XRD patterns of the Na (003) peak and Li (003) peak during $Na_{0.67}CoO_2$ ion exchange in 1 M Li ACN solution. The nucleation and left-shift of the $Li_{0.94}CoO_2$ peak starting from 1000 s accompanied by Na (003) peak left-shift were clearly revealed. FIG. 2F is a schematic showing both the surface reaction-limited and diffusion-limited exchange pathways at low Li and high Li ratios, respectively. $Na_{0.64}$ is one example Na phase of a surface reaction-limited ion exchange pathway.

FIG. 3A shows electrochemical curves of commercial $LiCoO_2$ after deintercalation of 40%, 50%, and 60% capacities in 1 M Na solution at C/10 with additional 41 h, 40 h and, 39 h soaking, respectively. FIGS. 3B, 3C show XRD patterns (FIG. 3B) and chemical compositions (FIG. 3C) of $Li_{0.40}CoO_2$, $Li_{0.50}CoO_2$, and $Li_{0.60}CoO_2$ after reaching equilibrium in 1 M Na solution. The dash lines are predicted Li and Na contents based on phase equilibrium. FIG. 3D shows an atomic resolution HAADF-STEM image of fully converted $Na_{0.48}CoO_2$ along [010] zone axis and the signal profile from the dashed area. Scale bar, 1 nm. FIG. 3E shows a SEM image and EDS maps of fully converted $Na_{0.48}CoO_2$. Scale bar, 30 μm.

FIG. 4A shows electrochemical curves of the electrochemical assisted ion exchange process. Once the intercalation current stops, the OCV goes back to equilibrium voltage through the Na phase change. FIG. 4B shows Lithium contents as a function of Na phase during electrochemical assisted ion exchange process. Measured (solid balls), calculated (empty circles) based on voltages and capacities in FIG. 4A, and predicted (gray dash line) based on the equilibrium equation and evolution equation are shown. FIG. 4C shows chemical compositions at different progress points shown in FIG. 4B. FIG. 4D shows XRD patterns of original P3-$Na_{0.67}CoO_2$ and fully converted $Li_{0.90}Na_{0.02}CoO_2$. FIG. 4E shows an atomic resolution HAADF-STEM image of fully converted $Li_{0.90}Na_{0.02}CoO_2$ along [010] zone axis and the signal profile from the dashed area. Scale bar, 1 nm.

FIG. 6A shows a Galvanostatic curve of P2-$Na_yCoO_2$ in the range of 0.37<y<0.87. FIG. 6B shows open-circuit voltage (OCV) curves of P2-$Na_yCoO_2$ (y=0.37, 0.47, 0.57, 0.67) during ion exchange. FIG. 6C shows chemical compositions of P2-$Na_yCoO_2$ (y=0.37, 0.47, 0.57, 0.67) after 24 hours ion exchange. Black dots and white dots are the Li contents and Na contents measured by ICP-MS. The dash lines are predicted Li and Na contents based on phase equilibrium. FIG. 6D shows XRD of P2-$Na_{0.67}CoO_2$ after 24 hours ion exchange. The separated Li phase located at 18.54° (2θ) is a Li full phase. Due to the same consideration as for the P3 case, it is assigned as $Li_{0.94}CoO_2$.

FIGS. 7A-7C show the established electrochemical assisted ion exchange can be conducted in 1-10000 Li—Na ACN. FIG. 7A shows electrochemical curves during the whole process. The OCV curves still show the four intermediate plateaus. FIGS. 7B, 7C show the electrochemical intercalation curves for $1^{st}$ inter (FIG. 7B, C/10) and $2^{nd}$ inter (FIG. 7C, C/40) shown in FIG. 7A. Four intermediate plateaus are also visible in 1-10000 Li—Na. The right panel shows the absolute current during intercalation.

DETAILED DESCRIPTION

Figure 1B:
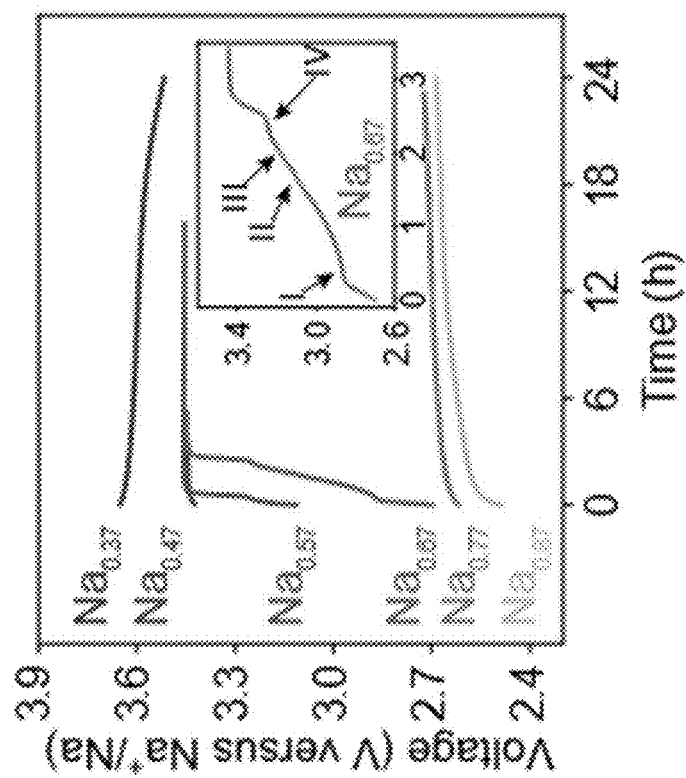
FIGS. 1A-1E show phase separation and two-phase equilibrium between $Li_{0.94}CoO_2$ and $Na_{0.48}CoO_2$.

Methods for synthesizing layered lithium transition metal oxides from layered sodium transition metal oxides are provided. Also provided are electrodes for lithium-ion batteries that include the layered lithium transition metal oxides. Similarly, methods for the synthesis of layered sodium transition metal oxides from layered lithium transition metal oxides and electrodes for sodium-ion batteries that include the layered sodium transition metal oxides are provided. The methods couple electrochemical intercalation of alkali ions (Li+ or Na+) with ion-exchange to overcome the kinetic limitations of ion-exchange in layered alkali transition metal oxides having low vacancy concentrations.

One aspect of the invention provides a method of forming layered $Li_{0.94}MO_2$ from $Na_yMO_2$, where 0.57≤y≤0.67 and M represents cobalt (Co), manganese (Mn), or nickel (Ni). The development of this method may be attributed, at least in part, to two discoveries by the inventors. First, the inventors discovered that a two-phase equilibrium exists between $Li_{0.94}MO_2$ and $Na_yMO_2$, where 0.45<y<0.51, for the exchange of sodium ions with lithium ions in the starting $Na_yMO_2$, where 0.57≤y≤0.67. And, second, the inventors discovered that, while the $Li_{0.94}MO_2$ forms via the ion-exchange once the Li phase separates from the Na host phase, the Na phase goes through a series phase changes beginning with the $Na_yMO_2$ phase where 0.57≤y≤0.67, to the final equilibrated $Na_yMO_2$ phase, where 0.45<y<0.51, during the ion-exchange.

By coupling ion-exchange with electrochemical ion intercalation and controlling the phase equilibrium and vacancies during the ion-exchange process, the starting sodium transition metal oxide can be substantially completely transformed into the layered lithium transition metal oxide or a mixed solution of layered lithium and sodium transition metal oxides (i.e., $Li_xNa_yMO_2$, where 0<x<1 and 0<y<0 and M is Co, Mn, or Ni) can be formed. The exchange of sodium ions with lithium ions in the layered transition metal oxides is a fully reversable process. This controllable and reversible electrochemically assisted ion-exchange process enables the synthesis of meta-stable layered lithium transition metal oxides, layered sodium transition metal oxides, and mixed layered lithium and sodium transition metal oxides that cannot be synthesized directly by more conventional methods, such as solid-state synthesis. As such, the present methods enlarge the layered oxide library for electrodes for both lithium-ion batteries and sodium-ion batteries.

One embodiment of a method for synthesizing a layered oxide having the formula $Li_xNa_yMO_2$, where $0<x<1$ and $0<y<1$ and M is Co, Mn, or Ni, includes the steps of: (a) providing a layered cobalt transition metal oxide having the formula $Na_yMO_2$, where $0.57 \leq y \leq 0.67$; (b) conducting a first cation-exchange on the $Na_yMO_2$, where $0.57 \leq y \leq 0.67$, in a solution containing dissolved lithium ions to convert the $Na_yMO_2$, where $0.57 \leq y \leq 0.67$, into a material comprising discrete phases of $Li_{0.94}MO_2$ and $Na_yMO_2$, where $0.45<y<0.51$; (c) conducting an electrochemical intercalation of lithium ions into the material to increase the $Li_{0.94}MO_2$ fraction in the material and regenerate $Na_yMO_2$, where $0.57 \leq y \leq 0.67$; and (d) conducting an additional cation-exchange on the material in the solution containing dissolved lithium ions to further increase the $Li_{0.94}MO_2$ fraction in the material and convert the $Na_yMO_2$, where $0.57 \leq y \leq 0.67$, back into $Na_yMO_2$, where $0.45<y<0.51$. Steps (c) and (d) may be repeated multiple times to increase the phase fraction of the $Li_{0.94}MO_2$ in the material until a desired phase fraction is achieved. By way of illustration, steps (c) and (d) can be cycled until substantially complete ion-exchange is achieved, where a substantially complete ion exchange results in a phase fraction of $Li_{0.94}MO_2$ of at least 90 mol. % in the final material. This includes embodiments in which the phase fraction of $Li_{0.94}MO_2$ in the final material is at least 95 mol. % and at least 98 mol. %.

It is advantageous to use a thermodynamically stable phase of the $Na_yMO_2$, where $0.57 \leq y \leq 0.67$, as the starting material for the $Li_{0.94}MO_2$ synthesis. For example, P2-$Na_{0.67}MO_2$ or P3-$Na_{0.67}MO_2$ can be used. However, other stable or meta-stable layered sodium transition metal oxides can also be used.

The first sodium-lithium cation exchange of the method is carried out on the starting $Na_yMO_2$, where $0.57 \leq y \leq 0.67$, in a solution comprising dissolved lithium ions ($Li^+$). The cation-exchange may be carried out at room temperature (23° C.) or near room temperature (for example, at temperatures in the range from 20° C. to 30° C.). However, higher temperatures can be used. Due to kinetic limitations on the cation-exchange, the exchange does not go to completion. Instead, the result of the initial cation-exchange is a two-phase material comprising $Li_{0.94}MO_2$ and $Na_yMO_2$, where $0.45<y<0.51$. In order to increase the phase fraction of $Li_{0.94}MO_2$ in the material, the ion-exchange is followed by an electrochemical intercalation of lithium ions into the material. This is accomplished by applying a potential (an "intercalation potential") across the material. Under the influence of this potential, lithium ions in the solution migrate into the layered structure of the alkali transition metal oxides. As a result, the phase fraction of $Li_{0.94}MO_2$ in the material is increased and the $Na_yMO_2$, $0.45<y<0.51$, phase is converted back into $Na_yMO_2$, $0.57 \leq y \leq 0.67$. This material can then undergo an additional cation-exchange step to further increase the phase fraction of $Li_{0.94}MO_2$ in the material, while regenerating the equilibrium $Na_yMO_2$ phase, where $0.45<y<0.51$.

Notably, because the layered oxides are highly selective for lithium ions over sodium ions, the electrochemical intercalation assisted ion-exchange can be carried out in a solution in which sodium ions are in excess over lithium ions. In fact, dilute solutions in which the lithium ion concentration is lower than 1 millimolar (mM), lower than 0.5 mM, or lower than 0.2 mM (e.g., in the range from about 0.1 mM to 1 mM) can be used. However, the methods can also be carried out in higher concentration solutions and in solutions in which the lithium ions are in excess.

Another aspect of the invention provides methods for the synthesis of a layered oxide having the formula $Na_yMO_2$, where $0.45<y<0.51$ and M is Co, Mn, or Ni, from the corresponding layered $LiMO_2$. One embodiment of such a method includes the steps of: providing a layered lithium transition metal oxide having the having the formula $LiMO_2$; conducting an electrochemical deintercalation of lithium ions from the material to convert the $LiMO_2$ into $Li_{0.4}MO_2$; and conducting a cation-exchange on the $Li_{0.4}MO_2$ in a solution containing dissolved sodium ions to convert the $Li_{0.4}MO_2$ into a material comprising $Na_yMO_2$ phases, where $0.45<y<0.51$. During the electrochemical deintercalation, a potential is applied across the $LiMO_2$ to force lithium ions out of the material. The subsequent cation exchange between sodium and lithium ions can completely (100%) or substantially completely ($\geq$90%, 95%, or 98%) convert the $LiMO_2$ into $Na_yMO_2$, where $0.45<y<0.51$.

The lithium phase-pure or lithium phase-rich layered transition metal oxides and the sodium phase-pure or sodium phase-rich layered transition metal oxides can be used as the active materials in electrodes for lithium-ion batteries and sodium-ion batteries, respectively. The layered transition metal oxides may be supported on an electrically conductive support substrate, such as a metal substrate, and/or may be mixed with an electrically conductive powder, such as a metal or carbon powder, to form the electrodes. Optionally, a binder may be used to enhance the mechanical integrity of the electrodes.

One embodiment of a lithium-ion battery includes: a battery compartment; a cathode comprising a material comprising discrete $Li_{0.94}MO_2$ and $Na_yMO_2$ phases, where $0.45<y<0.51$, wherein the phase fraction of the $Li_{0.94}MO_2$ in the material is at least 90 mol. %; an anode in electrical communication with the cathode; an electrically conductive wire connecting the anode to the cathode; and a lithium ion-conductive electrolyte disposed between the anode and the cathode. Typically, the lithium-ion battery will also include a separator, such as an ion-permeable membrane, in the electrolyte between the anode and the cathode in order to physically separate the anode from the cathode.

One embodiment of a sodium-ion battery includes: a battery compartment; a cathode comprising a material comprising a $Na_yMO_2$ phase, where $0.45<y<0.51$, wherein the phase fraction of the $Na_yMO_2$ in the material is at least 0.98 mol. %; an anode in electrical communication with the cathode; an electrically conductive wire connecting the anode to the cathode; and a sodium ion-conductive electrolyte disposed between the anode and the cathode. Typically, the sodium-ion battery will also include a separator, such as an ion-permeable membrane, in the electrolyte between the anode and the cathode in order to physically separate the anode from the cathode.

Example

The Example provides a detailed discussion of predictive ion exchange pathways and reveals an ion exchange mechanism for Li and Na in layered oxides using cobalt oxides as models. Counterintuitively, using Li ions at extremely low molar ratios (e.g. 1-1000 molar ratio Li—Na) and small excess (e.g. 18% excess of Li to target amount), near equilibrium exchange with $Na_yCoO_2$ can be achieved by taking advantage of structural Li preference. Instead of forming $Li_xCoO_2$ with the same cation content (x=y), the structure nucleates a $Li_{0.94}CoO_2$ phase that has the smallest potential difference with the Na phase, which drives the Na phase change to form the equilibrium between $Na_{0.48}CoO_2$ and $Li_{0.94}CoO_2$. The phase separation and equilibrium behaviors allow for the prediction of not only the final compositions and phases, but also the intermediate states to map out the kinetic pathways. The phase separation behavior was also captured at far from equilibrium conditions with high Li concentrations and large Li excesses. This Example also demonstrates that $Li_{0.94}CoO_2$ nucleation is a critical step to initiate the ion exchange, following which the reaction proceeds with either a diffusion-limited (high Li ratio) or a surface reaction-limited (low Li ratio) mechanism. Additionally, a large kinetic energy barrier at low vacancy levels is also identified, which defines the accessible and inaccessible ion exchange pathways. Guided by the understanding in vacancy-dependent ion preference and diffusion barriers, $Na_yCoO_2$ (~98% Na purity) conversion from the parent $Li_xCoO_2$ was identified for the first time and $Na_y$-$CoO_2$ conversion to $Li_{0.94}CoO_2$ (~98% Li purity from 1-1000 molar ratio Li—Na) via electrochemical assisted ion exchange was also identified, with the latter being of significant importance for Li extraction.

$Na_{0.48}CoO_2$ and $Li_{0.94}CoO_2$ Phase Equilibrium

Figure 1A:
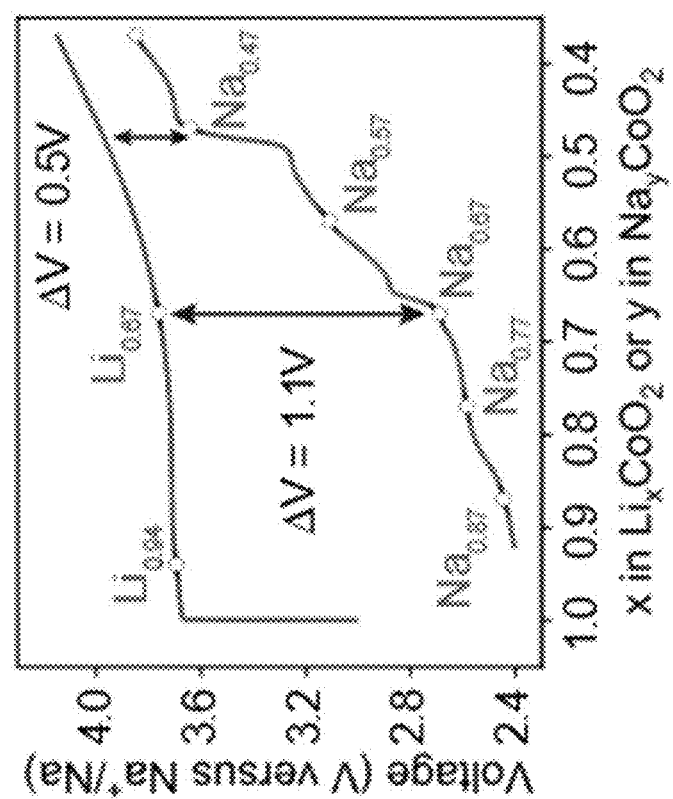

Platelet-like P3-$Na_{0.67}CoO_2$ particles were used as model materials to systematically explore the ion exchange process. P3-$Na_{0.67}CoO_2$ particles have a size around 100-500 nm with a thickness less than 100 nm. FIG. 1A shows the galvanostatic curves of O3-$Li_xCoO_2$ and P3-$Na_yCoO_2$ at slow kinetics (C/80) which represent mostly their thermodynamic differences. O3-$Li_xCoO_2$ and P3-$Na_yCoO_2$ have distinct phase transformations with respect to vacancy change. Importantly, the significant voltage differences between $Li_xCoO_2$ and $Na_yCoO_2$ (e.g. ~1.1V at x=y=0.67) shown on the galvanostatic curves indicates the preference for Li. Such structural Li preference is a function of the vacancy level wherein the Li preference increases as the vacancy level decreases.

To control the ion exchange and limit possible kinetic pathways, the ion exchange reaction was designed near equilibrium using a low Li ratio (1-1000 Li—Na, 1 mM Li and 1 M Na in acetonitrile (ACN) solution, unless otherwise specified). $Na_yCoO_2$ with varying y (y=0.37, 0.47, 0.57, 0.67, 0.77, 0.87) were prepared to investigate the ion exchange at different structural Li preferences (as marked by $DV=V_{LixCoO2}-V_{NayCoO2}$). The open-circuit voltage (OCV) of P3-$Na_yCoO_2$ during ion exchange was monitored. Interestingly, the OCV curve of $Na_{0.67}CoO_2$ has a shape similar to the galvanostatic curve at the range between y=0.67 and y=0.48 but with an additional final plateau at the voltage of 3.45V (FIG. 1B). Four intermediate plateaus (I, II, III, and IV) on the galvanostatic charging curve also appear on the OCV curve of $Na_{0.67}CoO_2$ (inset of FIG. 1B), which indicates the occurrence of similar phase transformations. The differential capacity curve of P3-$Na_{0.67}CoO_2$ has four peaks in the voltage range of 2.8V-3.6V, which correspond to the four plateaus shown in the galvanostatic charging curve. This "pseudo-charging" behavior (potential changing like charging but without redox reactions) suggests that ion exchange with Li can induce the structure change of the starting $Na_yCoO_2$. The "pseudo-charging" is also observed at Na content (y) of 0.57. However, for other sodium contents (y=0.37, 0.47, 0.77, and 0.87), no "pseudo-charging" behavior was observed.

Figure 1C:
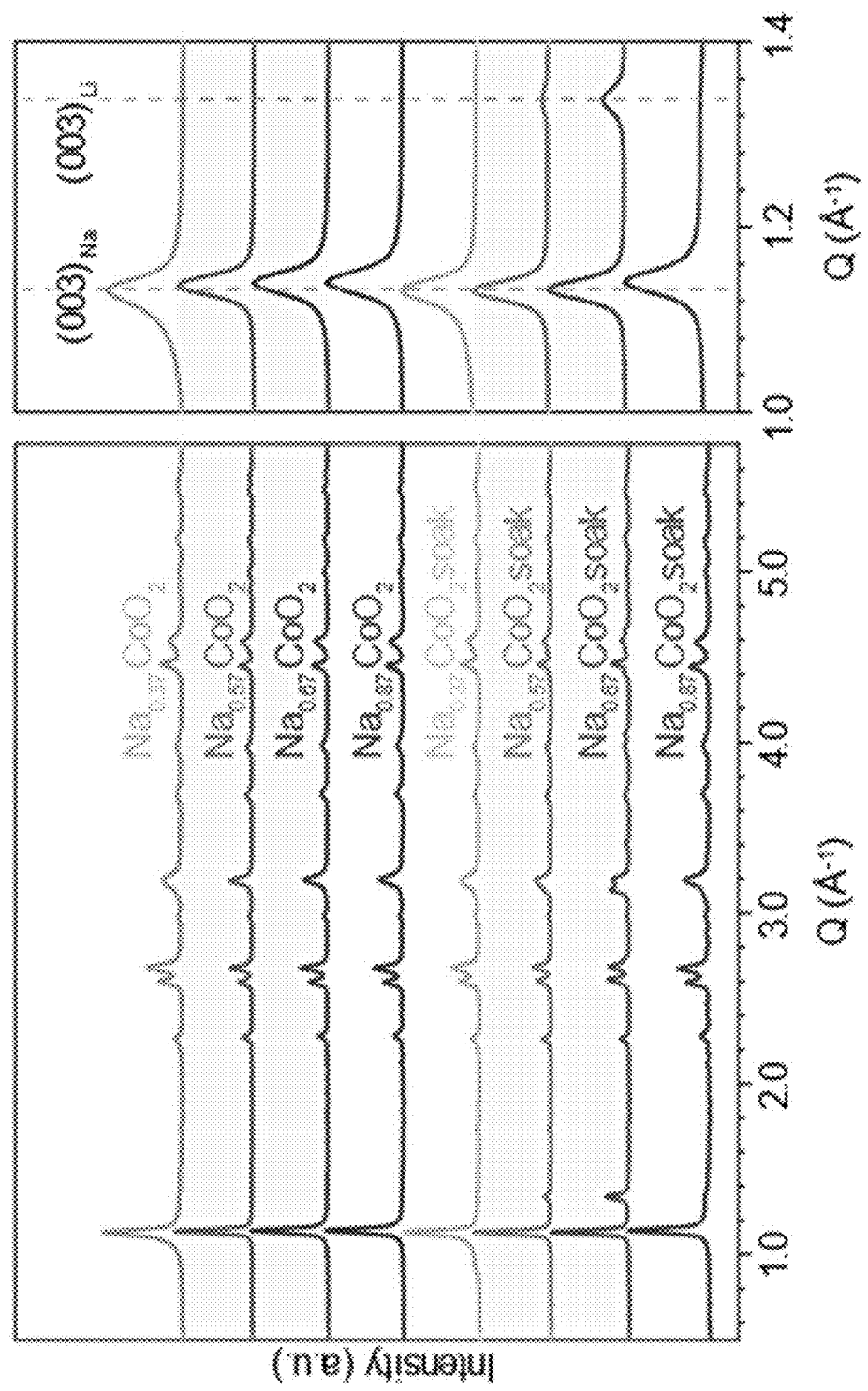

Synchrotron X-ray diffraction (XRD) was conducted to identify the Li and Na phases after ion exchange. For parent $Na_yCoO_2$ before ion exchange, the (003) peaks gradually left-shifted as the sodium content y decreased, corresponding to the expansion of interlayer distance (FIG. 1C). After ion exchange, rather than forming the intermediate phase observed at the elevated temperature, a new Li phase appeared for $Na_{0.57}CoO_2$ and $Na_{0.67}CoO_2$ which showed "pseudo-charging" behaviors. The (003) peak of the new Li phase was at the same position and assigned to $Li_{0.94}CoO_2$. Accompanied by the Li phase appearance, the Na (003) peaks of the $Na_{0.57}CoO_2$ and $Na_{0.67}CoO_2$ left-shifted to the position of the $Na_{0.48}CoO_2$ phase (see Methods for $Li_{0.94}CoO_2$ and $Na_{0.48}CoO_2$ phase assignment). Varying the ion exchange time did not affect the Li contents for $Na_{0.67}CoO_2$, which illustrates the equilibrium for $Na_{0.67}CoO_2$ had been established within 12 hours. This, and the continuation of the final plateau (FIG. 1B), indicate the ion exchange process already reached a steady state and the formed $Li_{0.94}CoO_2$ phase and $Na_{0.48}CoO_2$ phase were in equilibrium. However, for $Na_{0.37}CoO_2$ and $Na_{0.87}CoO_2$, no obvious Li phase was observed after 24 h ion exchange based on synchrotron XRD characterization.

Figure 1D:
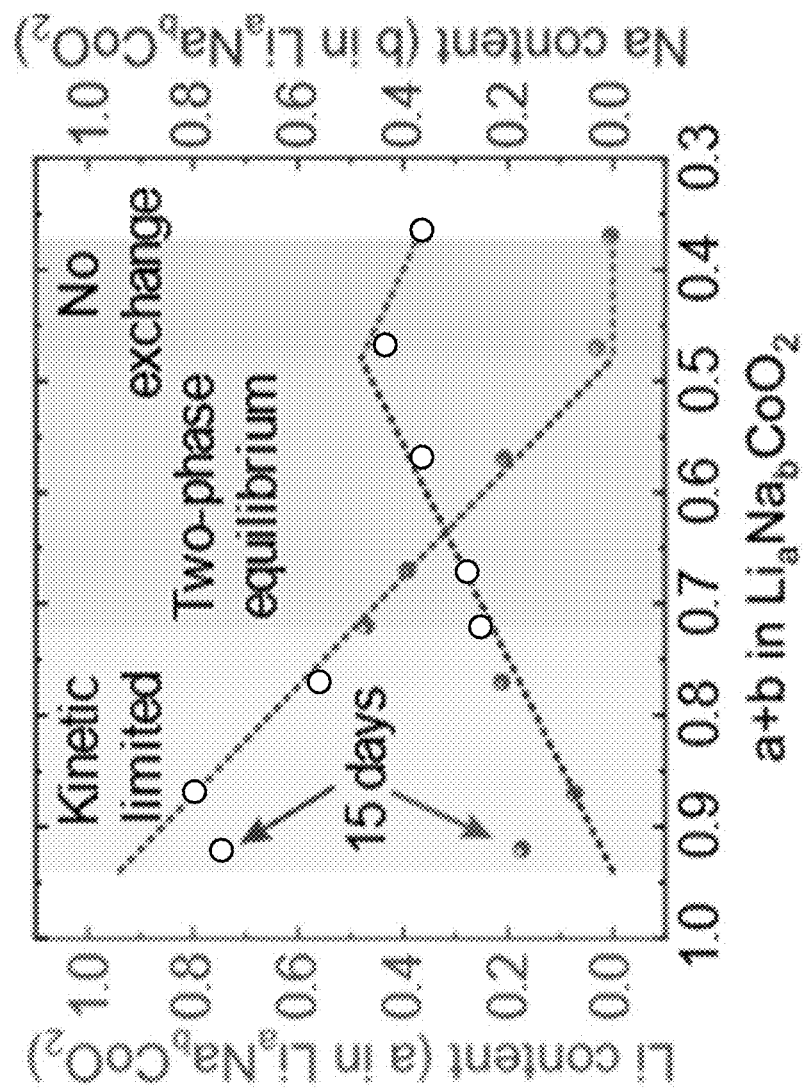
Figure 1E:
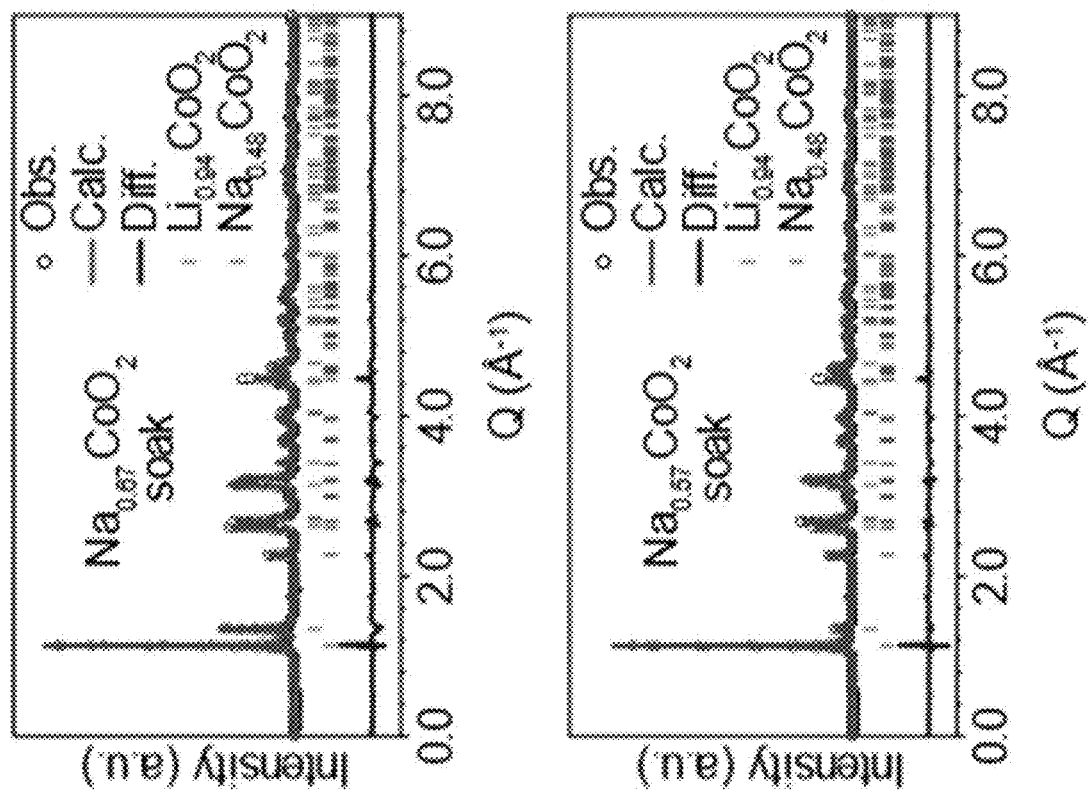

If two-phase equilibrium between $Li_{0.94}CoO_2$ and $Na_{0.48}CoO_2$ exists in the ion exchange process, the Li and Na contents a and b can be calculated in the structure $Li_aNa_bCoO_2$ based on the vacancy level (see equations in Methods). The chemical compositions are $Li_{0.47}Na_{0.25}CoO_2$, $Li_{0.39}Na_{0.28}CoO_2$, and $Li_{0.21}Na_{0.36}CoO_2$ after ion exchange for the starting materials $Na_{0.72}CoO_2$, $Na_{0.67}CoO_2$, and $Na_{0.57}CoO_2$. The excellent agreement between the measured chemical compositions and predicted chemical compositions based on the equilibrium equation confirms the two-phase equilibrium between $Li_{0.94}CoO_2$ and $Na_{0.48}CoO_2$ (FIG. 1D), which is also proved by Rietveld refinement results (FIG. 1E). However, based on the two-phase equilibrium, $Na_{0.77}CoO_2$ and $Na_{0.87}CoO_2$ should convert to $Li_{0.59}Na_{0.18}CoO_2$ and $Li_{0.80}Na_{0.07}CoO_2$, respectively. The experiment results showed that the final compositions ($Li_{0.21}Na_{0.56}CoO_2$ and $Li_{0.07}Na_{0.80}CoO_2$, respectively) had much less Li than the predicted value, indicating kinetic limitations. Such kinetic barrier is so high that even after 15 days of ion exchange, the Li content a was still 0.17 instead of 0.90 for $Na_{0.92}CoO_2$, and even when the exchange solution was changed to 1 M Li, the ion exchange could not go to completion. A large kinetic barrier may be partially due to the vastly different diffusion coefficients (approximately two orders of magnitude) from the ~30% to ~10% vacancy level. The following section demonstrates that this kinetic limitation can be overcome via an electrochemical assisted ion exchange process.

Based on the final compositions and phases, the ion exchange process was divided into three different regions. First, in the range of 0.48≤a+b≤0.72 (FIG. 1D), phase equilibrium was established between $Li_{0.94}CoO_2$ and $Na_{0.48}CoO_2$. Second, with 0.72<a+b≤0.94 (FIG. 1D), such as starting from $Na_{0.77}CoO_2$ and $Na_{0.87}CoO_2$, even though two-phase equilibrium was predicted, the ion exchange could not complete due to large kinetic barriers at low vacancy levels. Third, for 0.37≤a+b≤0.48 (FIG. 1D), no "pseudo-charging" behavior was observed and $Na_yCoO_2$ was the stable phase without ion exchange. As indicated by the potentials in FIG. 1A, with y in $Na_yCoO_2$ decreasing to 0.48, the structural preference for Li decreased significantly (DV decreases from 1.1V to 0.5V). With the low starting Li ratio (1-1000 Li—Na), the driving force was insufficient to initiate the ion exchange. By using a higher Li ratio (1 M Li), the ion exchange of $Na_{0.37}CoO_2$ was complete, confirming the limitation was from the thermodynamic driving force. However, such ion exchange does not follow the two-phase equilibrium route between $Li_{0.94}CoO_2$ and $Na_{0.48}CoO_2$, since the cation content is out of the equilibrium range.

This phase separation and equilibrium phenomenon accompanied by the "pseudo-charging" behavior is not unique to the P3-$Na_yCoO_2$ system. Similar phenomena were observed for P2-$Na_yCoO_2$ exchanged with Li in 1-1000 Li—Na CAN (FIG. 6). Based on the same characterization, the equilibrated Li phase and Na phase in the P2-$Na_yCoO_2$ system were assigned as O2-$Li_{0.94}CoO_2$ and P2-$Na_{0.46}CoO_2$, respectively.

Resolving Ion Exchange Pathways

Figure 2B:
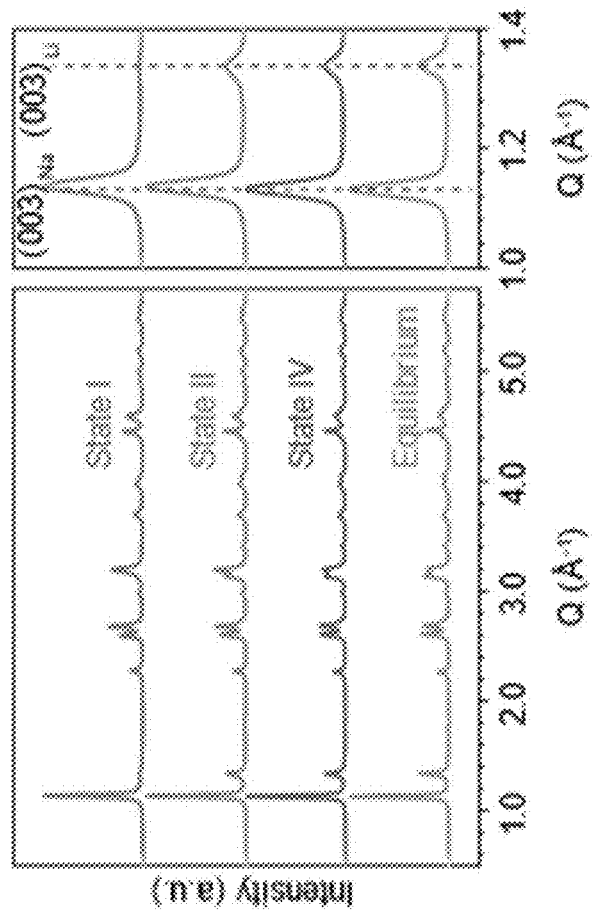
FIGS. 2A-2F show revealing structural evolution during Li ion exchange with $Na_{0.67}CoO_2$.
Figure 2A:
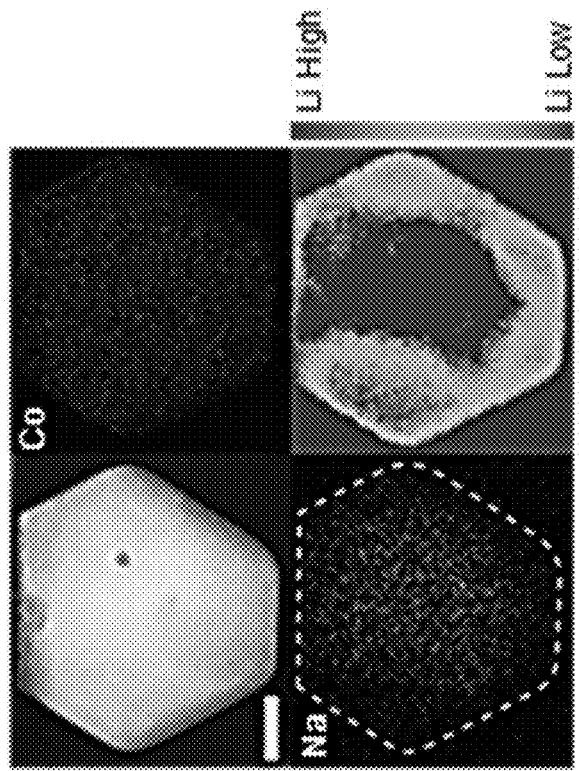

Before resolving ion exchange pathways, it was first necessary to understand the phase equilibrium between $Li_{0.94}CoO_2$ and $Na_{0.48}CoO_2$. From the galvanostatic curves, $Li_{0.94}CoO_2$ and $Na_{0.48}CoO_2$ have similar potentials that allow the structure to establish equilibrium. In contrast, direct conversion of $Na_{0.67}CoO_2$ to $Li_{0.67}CoO_2$ will cause a large potential difference at the reaction interface which could lead to structural instability. Moreover, the phase equilibrium between $Li_{0.94}CoO_2$ and $Na_{0.48}CoO_2$ indicates that charge redistribution between $Co^{3+}/Co^{4+}$ must occur during the phase change. The in-plane electron resistivity is much lower than that of out-of-plane and across-particle electron resistivities. Therefore, in-layer intra-particle phase separation would be the most feasible pathway to establish the phase equilibrium. Scanning transmission electron microscopy energy-dispersive x-ray spectroscopy (STEM EDX) and electron energy loss spectroscopy (EELS) were then performed to resolve the Na and Li distribution, respectively. The results proved the in-layer intra-particle phase separation with Na mainly in the center and Li at the corners and edges in a single hexagonal-like particle (FIG. 2A). Despite the fact that Li and Na are commonly thought to not coexist in one layer, this nonuniform distribution of Li and Na in the basal plane indicates that the ion exchange process does not follow the slab-by-slab exchange route.

Figure 2D:
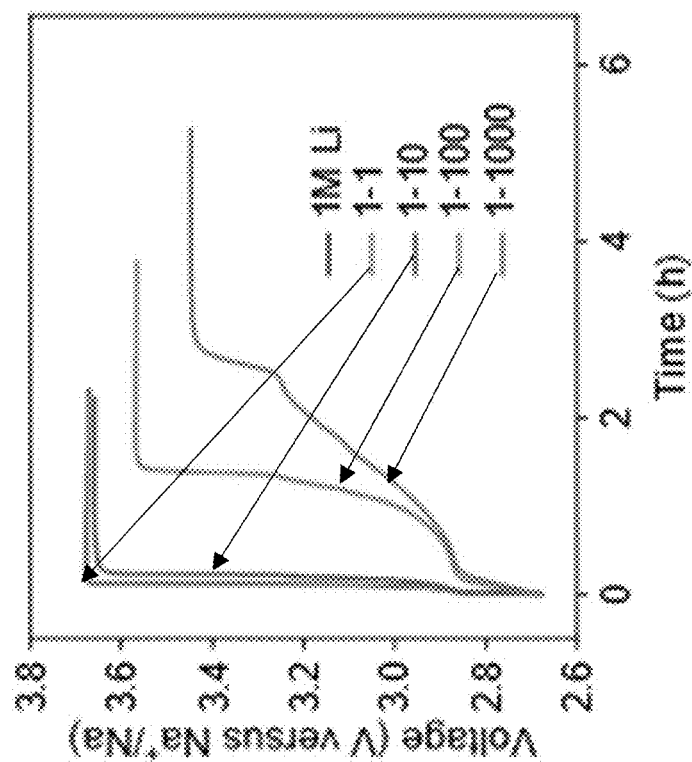
Figure 2C:
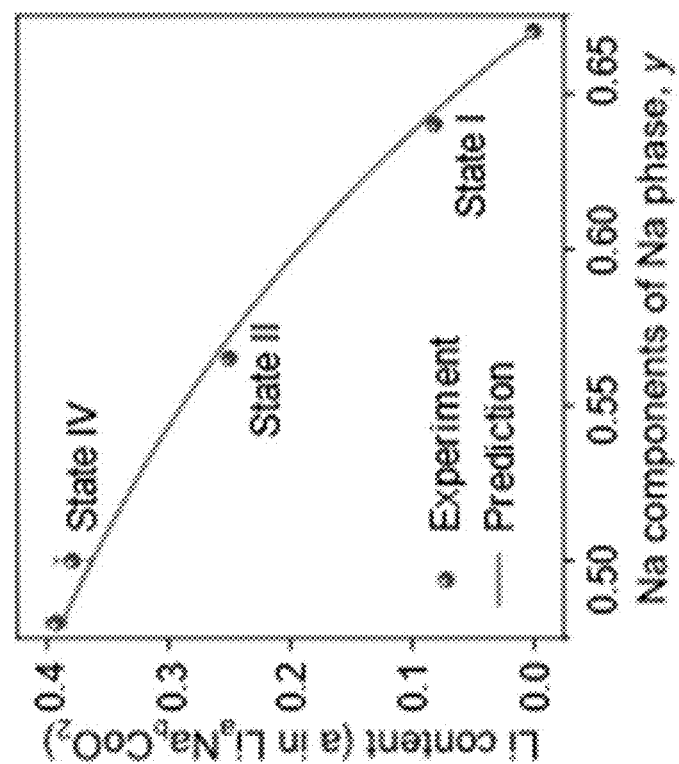

To gain the full picture of ion exchange pathways, several intermediate states during ion exchange were characterized by synchrotron XRD. The ion exchange process was quenched at the I, II, and IV plateaus, and denoted as the state I, II, and IV respectively. At state I, the structure directly formed $Li_{0.94}CoO_2$ (FIG. 2B) instead of $Li_{0.67}CoO_2$ as proposed in the slab gliding model. (Tournadre, F. et al., *Journal of Solid State Chemistry* 177, 2803-2809 (2004).) The formation of $Li_{0.94}CoO_2$ is favorable, since it has the smallest potential difference to $Na_yCoO_2$ (y>0.48). The observed phase transformation indicates that the ion exchange started with $Li_{0.94}CoO_2$ nucleation, and then the Na phase changed from $Na_{0.67}CoO_2$ to the final equilibrated phase $Na_{0.48}CoO_2$ as the Li phase grew. The persistence of the $Li_{0.94}CoO_2$ phase during the entire ion exchange allowed for the determination of the chemical composition and phase evolution of $Li_aNa_bCoO_2$ based on the evolution equation (Methods). The chemical compositions calculated based on the evolution equation, inductively coupled plasma mass spectrometry (ICP-MS) measurement, and Rietveld refinement all showed good agreement, supporting the proposed evolution pathway (FIG. 2C).

Figure 2E:
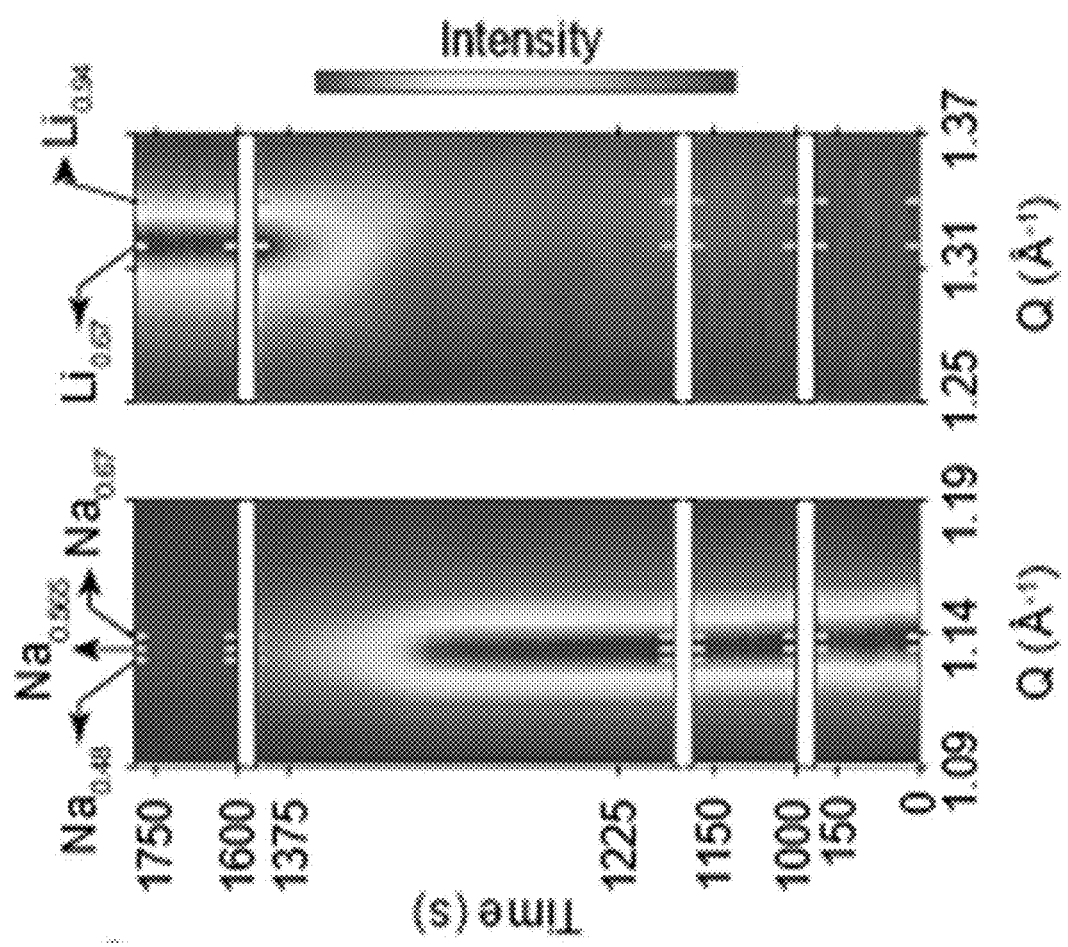

To understand whether the proposed phase separation process is a general evolution pathway, the ion exchange process was studied at different Li—Na ratios. All the OCV curves showed "pseudo-charging" behavior in 1-1000, 1-100, 1-10, 1-1 (molar ratio Li—Na, Na concentration was fixed as 1 M), and 1 M Li acetonitrile solution, but with different plateau numbers and final plateau potentials. The difference in final plateau potentials can be understood from the Nernst shift of the potential of the $Li_{0.94}CoO_2$ phase in solutions with different Li concentrations (FIG. 2D). The four intermediate plateaus during Na phase transformation were still visible in 1-100 and 1-10 cases. For 1-1 and 1 M Li, the fast exchange kinetics makes capturing intermediate steps challenging. But the appearance of the first plateau was observed. In situ synchrotron XRD was then performed for the case of 1 M Li. The emergence of the $Li_{0.94}CoO_2$ (003) peak at 1225 s 1375 s (FIG. 2E) demonstrated again that the exchange process initiates via $Li_{0.94}CoO_2$ nucleation. However, in this condition, both Li and Na phases changed after $Li_{0.94}CoO_2$ nucleation, as shown by the left-shift of both Li and Na peaks (FIG. 2E), and then finally a single $Li_{0.67}CoO_2$ phase was established with the disappearance of the Na phase.

Figure 2F:
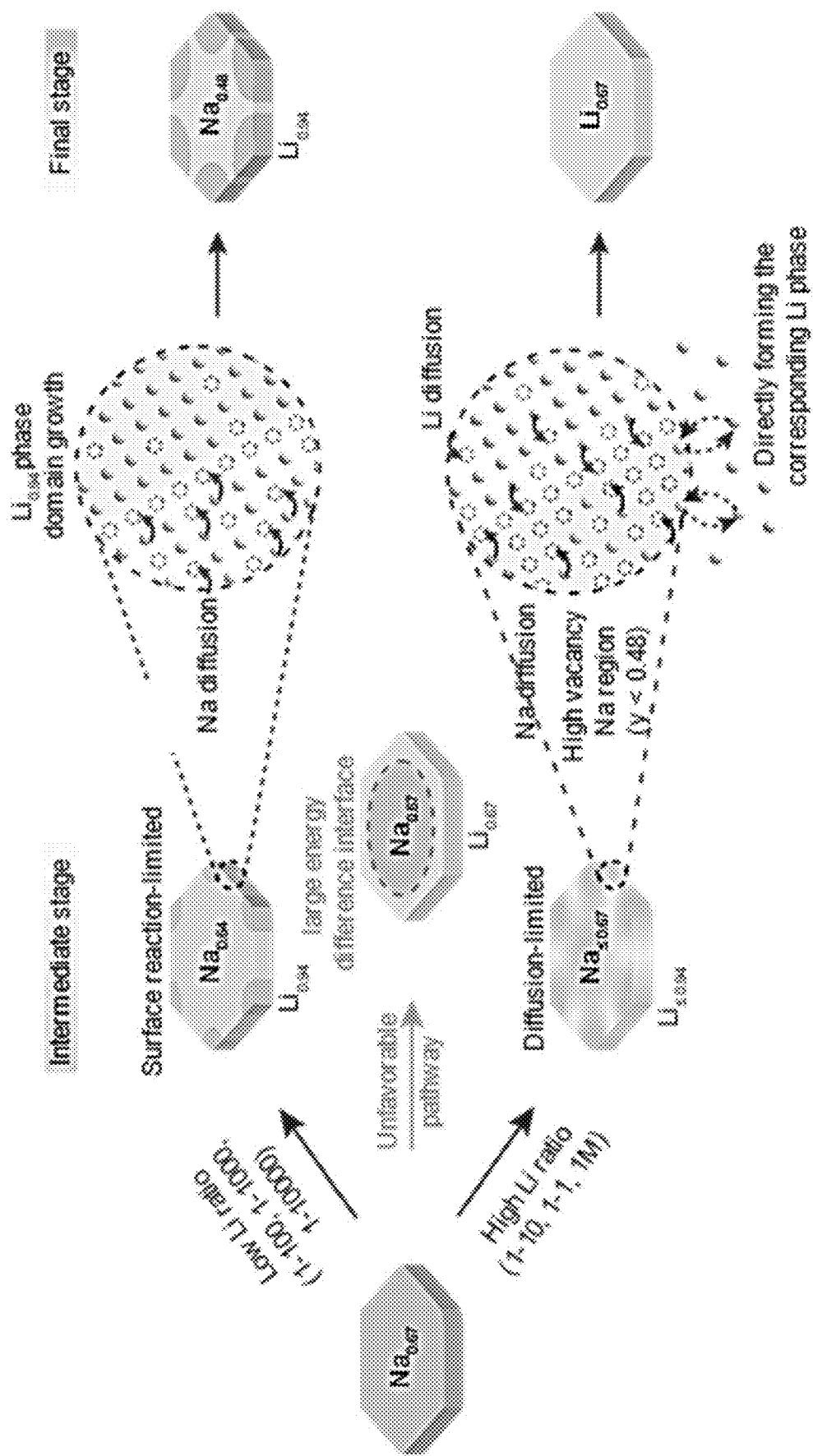

This result points to two ion exchange routes following $Li_{0.94}CoO_2$ nucleation. When the solution Li ratio is low (e.g. 1-1000 Li—Na), Li exchange with surface Na is the rate-limiting step (surface reaction-limited). Structural Na can diffuse to fill up the vacancy formed from $Li_{0.94}CoO_2$ phase nucleation and growth. Therefore, the Na phase change and a persistent $Li_{0.94}CoO_2$ phase in the whole exchange process (FIG. 2F) were only observed. When the solution Li ratio is high (e.g. 1 M Li), Li can quickly exchange with surface Na and nucleate a $Li_{0.94}CoO_2$ phase. The fast nucleation and growth of the $Li_{0.94}CoO_2$ phase leaves nearby domains with much higher vacancy levels. In this case, bulk Na diffusion alone cannot catch up with the ion exchange rate (diffusion-limited) and the diffusion of both Li and Na occurs to avoid forming unstable interfaces with large potential differences. Additionally, high vacancy Na phases ($Na_yCoO_2$, y≤0.48) can directly exchange with solution Li, skipping the $Li_{0.94}CoO_2$ nucleation when the solution Li ratio is high (e.g. 1 M Li). Hence, in the P3-$Na_yCoO_2$ in-situ synchrotron XRD, the left-shift of the Na peak caused by $Li_{0.94}CoO_2$ nucleation and growth was observed. Then the Li peak left-shifted to $Li_{0.67}CoO_2$ due to the merging of $Li_{0.94}CoO_2$ with high vacancy Li domains (formed from the direct conversion of high vacancy Na phases). The diffusion-limited ion exchange was also observed for P2-$Na_yCoO_2$ exchanging with 1 M Li. Due to the large particle size, both $Li_{0.94}CoO_2$ and high vacancy $Li_xCoO_2$ (x≤0.46) were observed without merging accompanied by a high vacancy $Na_yCoO_2$ (y≤0.46) phase.

Pure $Na_yCoO_2$ from $Li_xCoO_2$ Via Reversed Ion Exchange

Figure 3B:
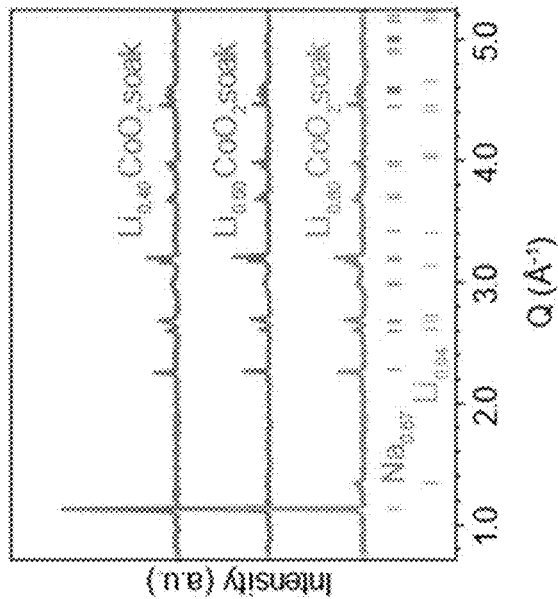
FIGS. 3A-3E show reverse conversion from $Li_xCoO_2$ to $Na_yCoO_2$.
Figure 3A:
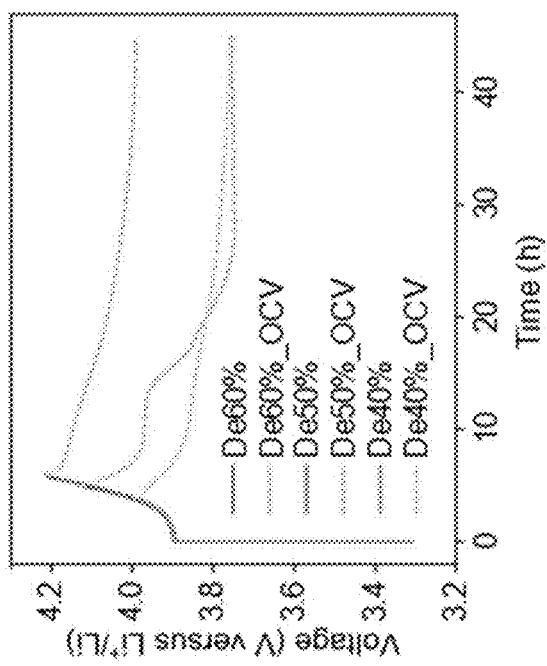
Figure 3C:
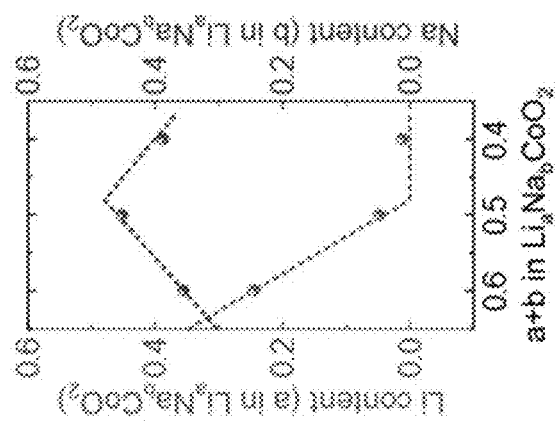
Figure 3D:
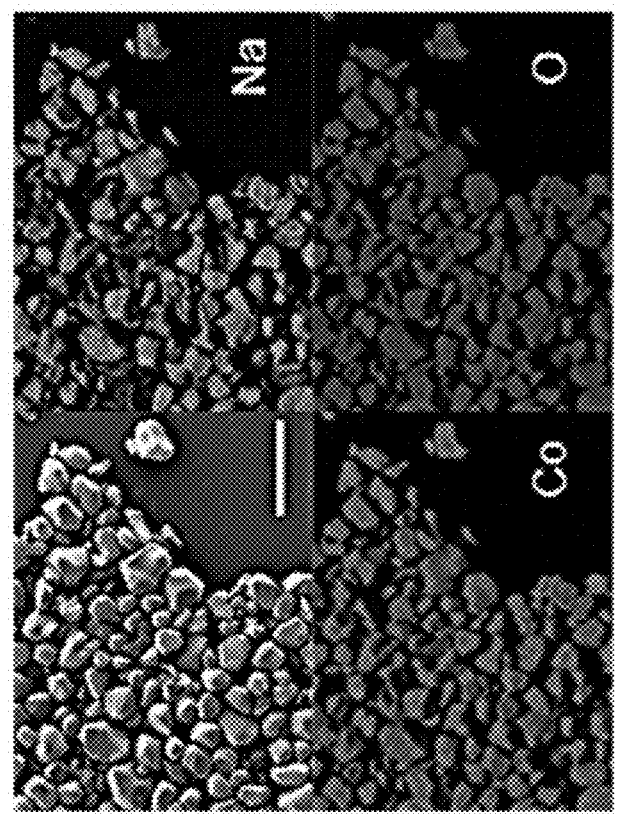
Figure 3E:
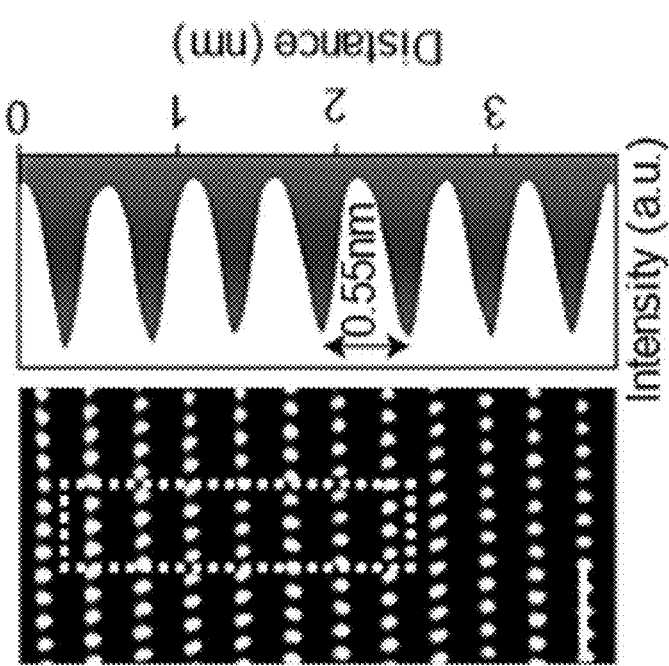
Figure 3F:
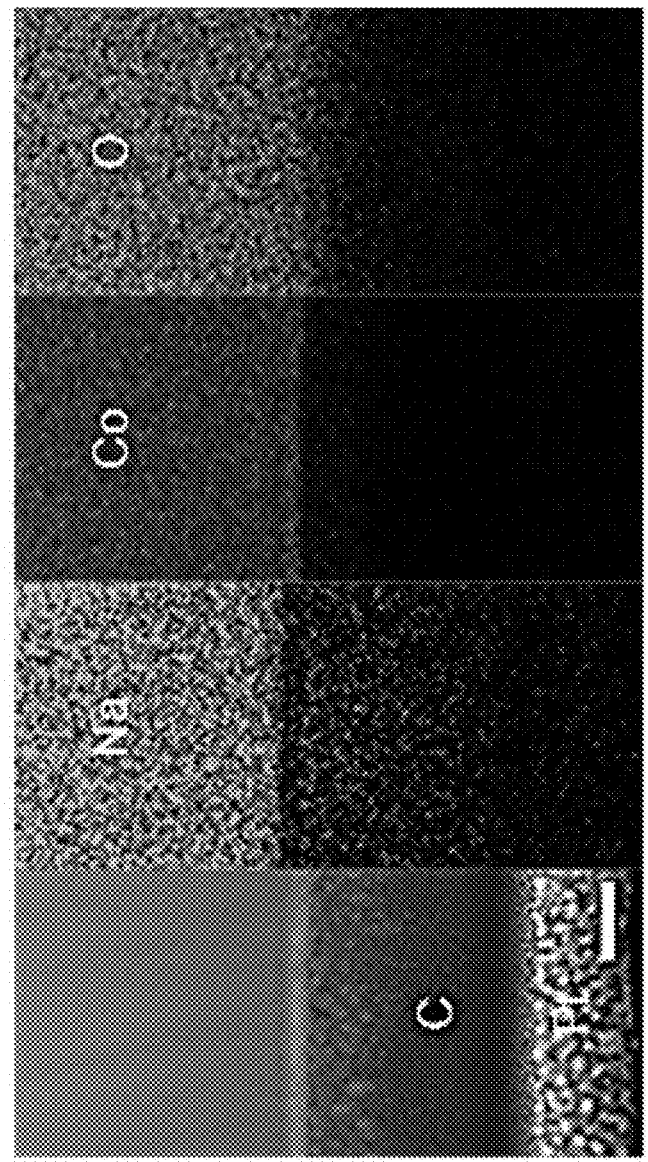
FIG. 3F shows a HAADF-STEM image and EDS maps of fully converted $Na_{0.48}CoO_2$. Scale bar, 50 nm.

Despite successful ion exchange to make Li cathodes, the reversed ion exchange with Na replacing the structural Li to achieve pure $Na_yCoO_2$ has not been reported before. Starting with a full Li structure without any vacancy only allows less than 1% of exchange at elevated temperature. (Xue, Z. et al. *ACS Appl. Mater. Interfaces* 10, 27141-27149 (2018).) Here, it was demonstrated that pure $Na_yCoO_2$ can be achieved from O3-$Li_xCoO_2$ when high structural Li preference regions are avoided. The phase equilibrium between $Li_{0.94}CoO_2$ and $Na_{0.48}CoO_2$ indicates that interconversion between Li and Na layered oxide is possible outside the range of phase equilibrium, which is a+b≥0.94 for Li and a+b≤0.48 for Na. $Li_{0.40}CoO_2$, $Li_{0.50}CoO_2$, and $Li_{0.60}CoO_2$ were prepared for the demonstration. The OCV curves went through a series of slopes and plateaus indicating the occurrence of ion exchange (FIG. 3A). After reaching equilibrium, $Li_{0.40}CoO_2$ and $Li_{0.50}CoO_2$ only showed Na diffraction peaks, whereas $Li_{0.60}CoO_2$ had both Li and Na diffraction peaks (FIG. 3B). Li contents a are 0.01 (~98% Na purity), 0.05, and 0.24 confirmed by ICP-MS (FIG. 3C), which agree with the predicted compositions of $Na_{0.4}CoO_2$, $Li_{0.04}Na_{0.46}CoO_2$, and $Li_{0.25}Na_{0.35}CoO_2$, respectively, based on the phase equilibrium. The exchanged $Na_{0.48}CoO_2$ from $Li_{0.48}CoO_2$ was used for further characterization. STEM imaging showed a 5.5 Å interlayer distance confirming the $Na_{0.48}CoO_2$ phase (FIG. 3D). The uniform distribution of Na EDS signal on both the particle ensemble level (SEM, FIG. 3E) and the single particle level (STEM, FIG. 3F) was observed, indicating the completion of Na ion exchange with the structural Li.

Overcoming the Kinetic Barrier by Electrochemical Assisted Ion Exchange

Next, a strategy was demonstrated to avoid the inaccessible ion exchange pathway and realize the formation of $Li_{0.94}CoO_2$ from $Na_{0.67}CoO_2$ at a low Li ratio (1-1000 Li—Na) and small Li excess (18% excess of Li to target amount, Methods). The phase equilibrium predicted a pure Li phase at $a+b \geq 0.94$. However, in the range of $0.72 < a+b < 0.94$, the final exchanged products did not follow the prediction due to the large kinetic barriers. Inspired by the established structure evolution pathway, the ion exchange was designed to start from the $Na_{0.67}CoO_2$ phase with enough vacancies and increase the cation content a+b to ~0.94 by multiple electrochemical intercalations while maintaining $0.48 \leq y \leq 0.67$ in the $Na_yCoO_2$ phase for fast ion exchange.

Figure 4A:
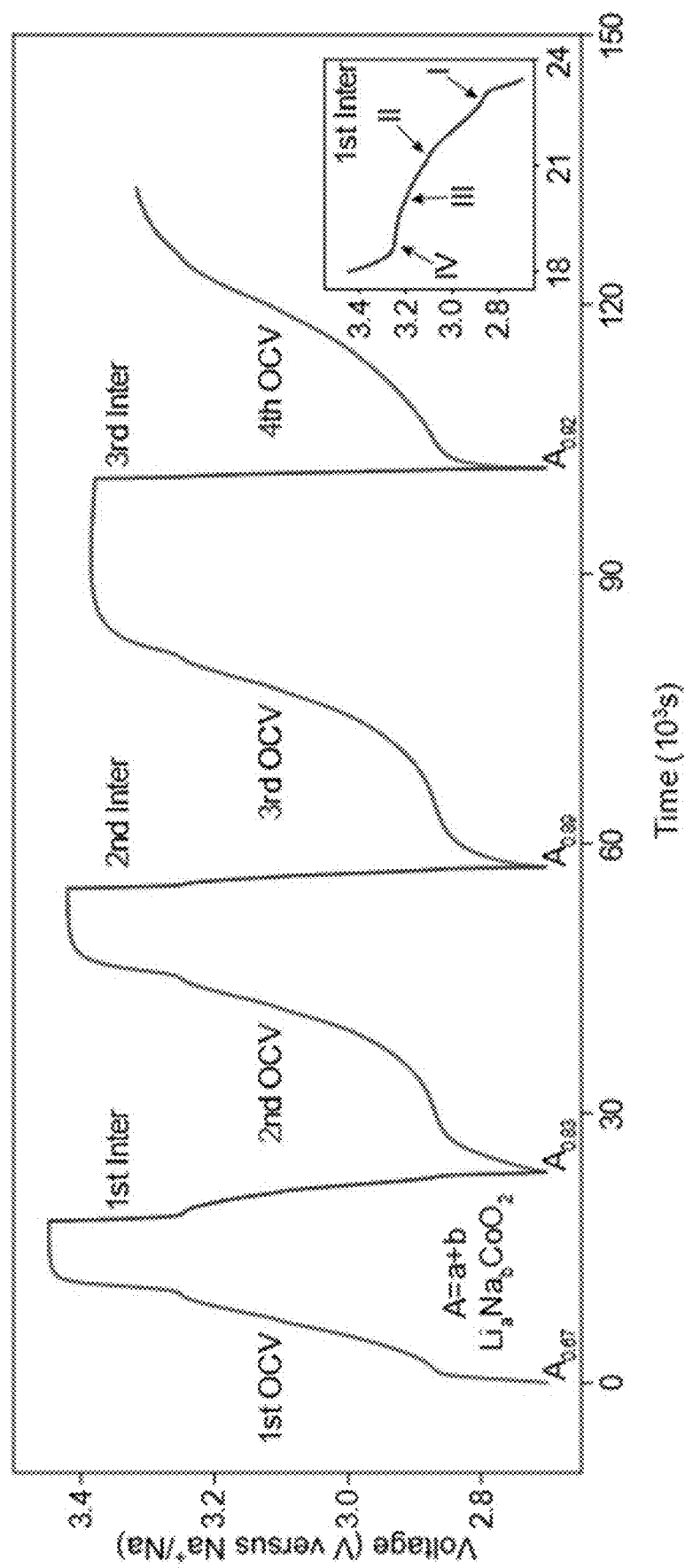
FIGS. 4A-4E show full conversion from $Na_yCoO_2$ to $Li_xCoO_2$ by electrochemical assisted ion exchange.

As shown in FIG. 4A, after the first phase equilibrium, the electrode was intercalated to the starting potential of $Na_{0.67}CoO_2$. Then the process was repeated until the electrode reached its full capacity. Due to the ongoing exchange, the potential went back to the equilibrium potential once the intercalation current was stopped. Moreover, the intercalation voltage profile also shows the same four plateaus, which correspond to the transformation from $Na_{0.48}CoO_2$ to $Na_{0.67}CoO_2$. After three times of intercalation, the total amount of alkali-metal ions reached 0.92 (a+b=0.92 for $Li_aNa_bCoO_2$).

Figure 4B:
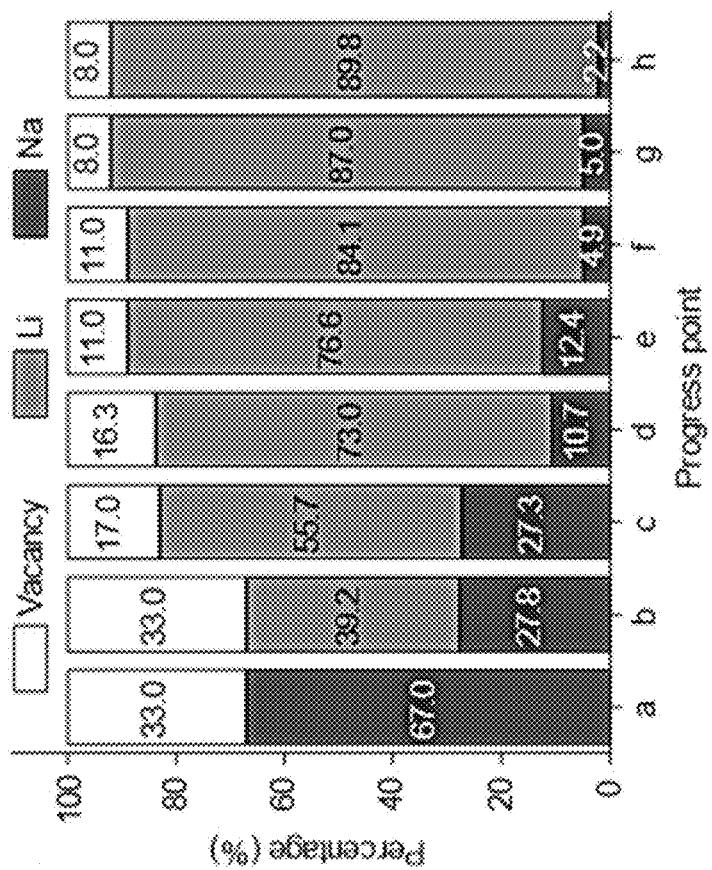
Figure 4C:
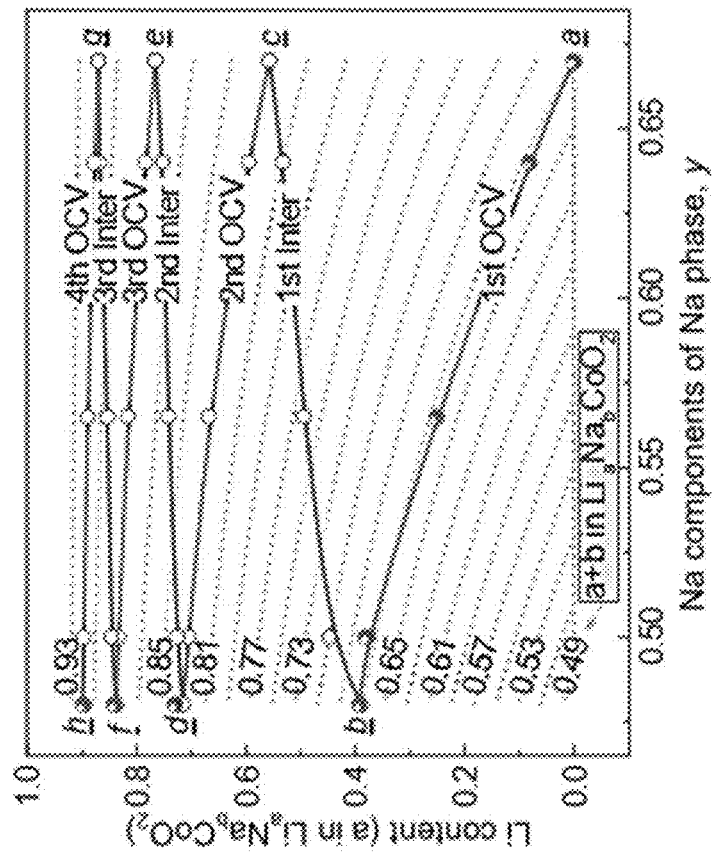
Figure 4E:
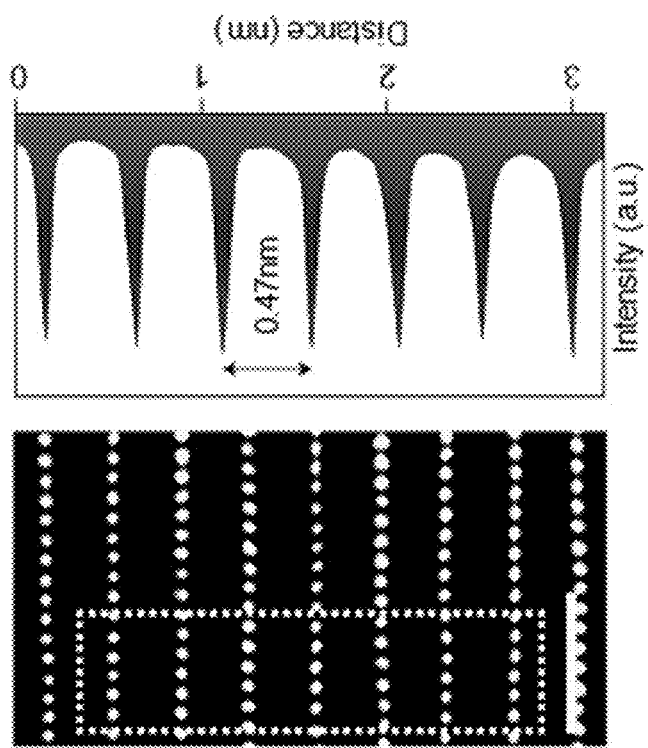
Figure 4D:
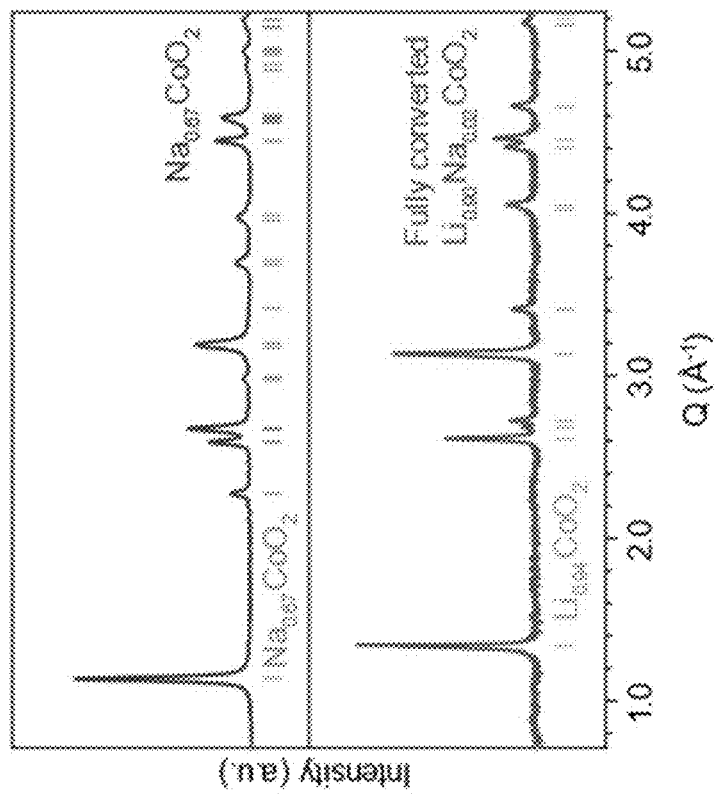

Even though the intercalation process is accompanied by a simultaneous ion exchange process, the chemical composition evolution during the whole process can be predicted using the Na component in the Na phase reflected by the electrochemical potential. The measured compositions at intermediate steps and the calculated compositions based on the evolution equation show excellent matching (FIGS. 4B-4C). This proves again that the ion exchange process is governed by the two-phase equilibrium in the whole range of $0.48 \leq a+b \leq 0.94$. With the electrochemical assisted ion exchange, a complete exchanged lithium cobalt oxide ($Li_{0.90}Na_{0.02}CoO_2$) was obtained. A minor 2% of Na, based on ICP-MS, was detected in the structure, which also existed for the ion exchange conducted with a high Li ratio and large excess ($Li_{0.95}Na_{0.016}CoO_2$ was obtained from exchange in 5 M LiOH and LiCl solution (1:1) for 19 hours). The structural characterization shows pure XRD patterns of $Li_{0.94}CoO_2$ (FIG. 4D). The corresponding 4.7 Å interlayer spacing was also observed for $Li_{0.90}Na_{0.02}CoO_2$ by HAADF-STEM which supports the successful conversion to $Li_{0.94}CoO_2$ (FIG. 4E).

Figure 7A:
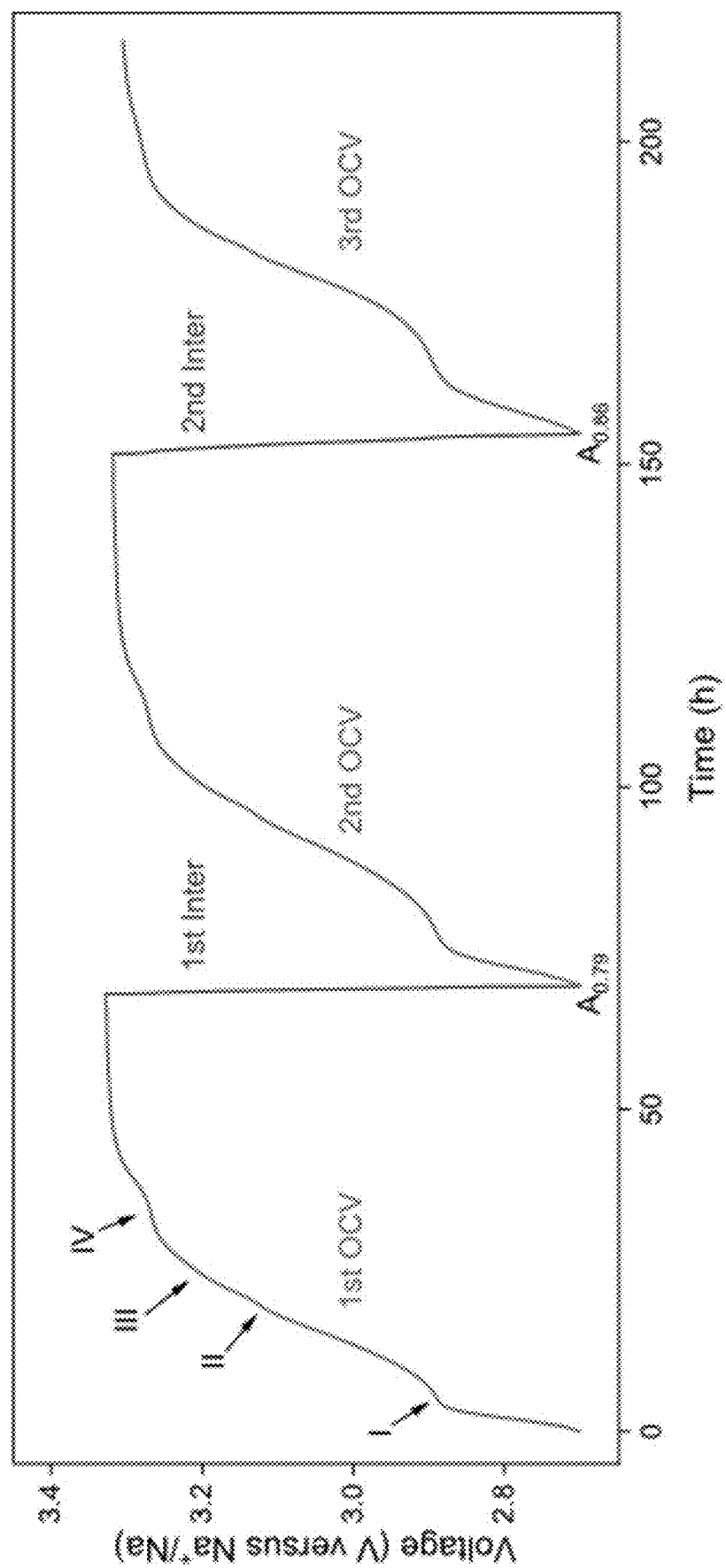
Figure 7B:
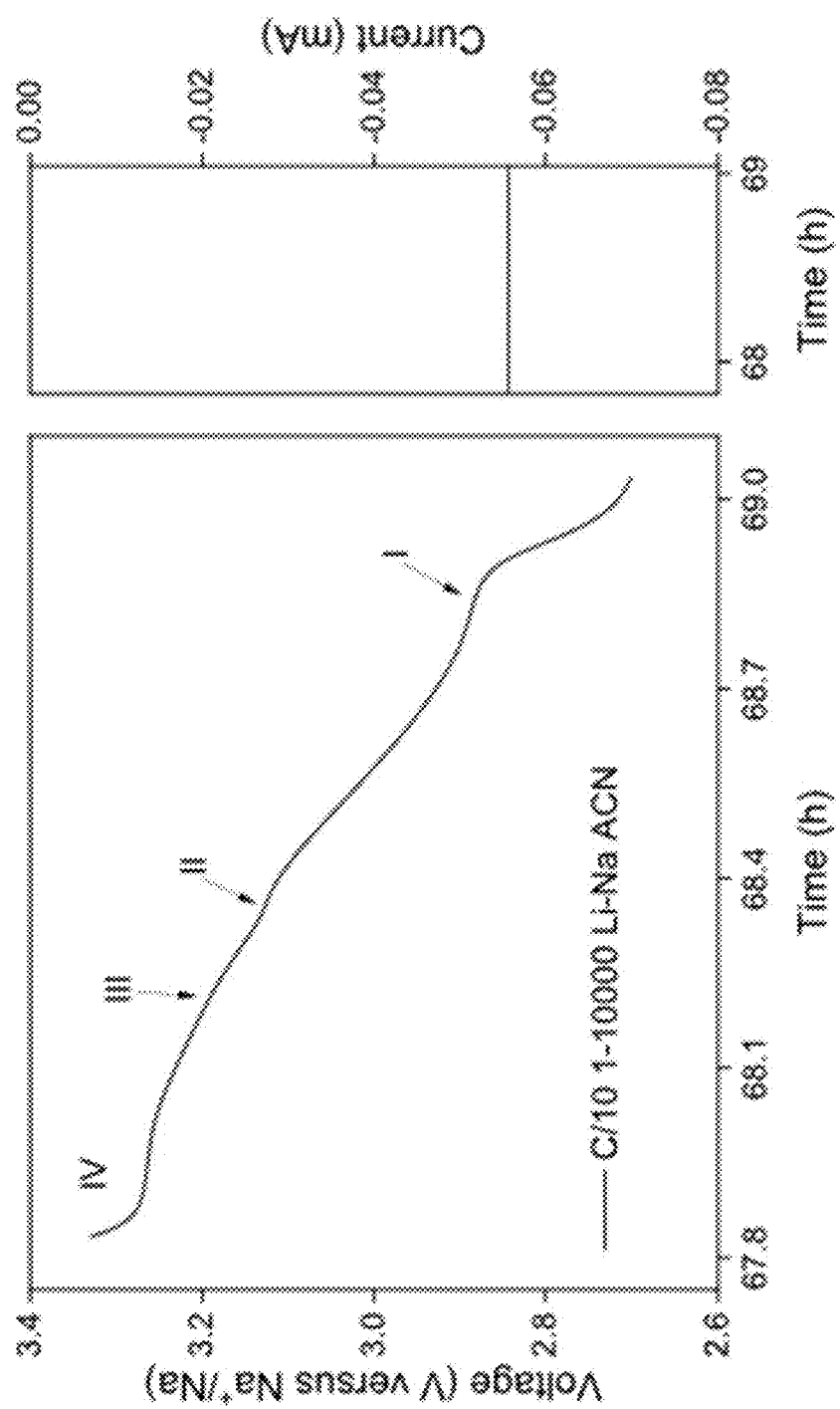

Since the $Na_{0.67}CoO_2$ to $Li_{0.94}CoO_2$ conversion was done in 1-1000 Li—Na solution, it marks the excellent structural selectivity ($4.5 \times 10^4$, Methods) for layered oxide to enable Li extraction application with ~98% Li purity. Moreover, it was demonstrated that the Li extraction can also be achieved using an even lower Li ratio (1-10000 Li—Na) (FIGS. 7A-7C).

Figure 5:
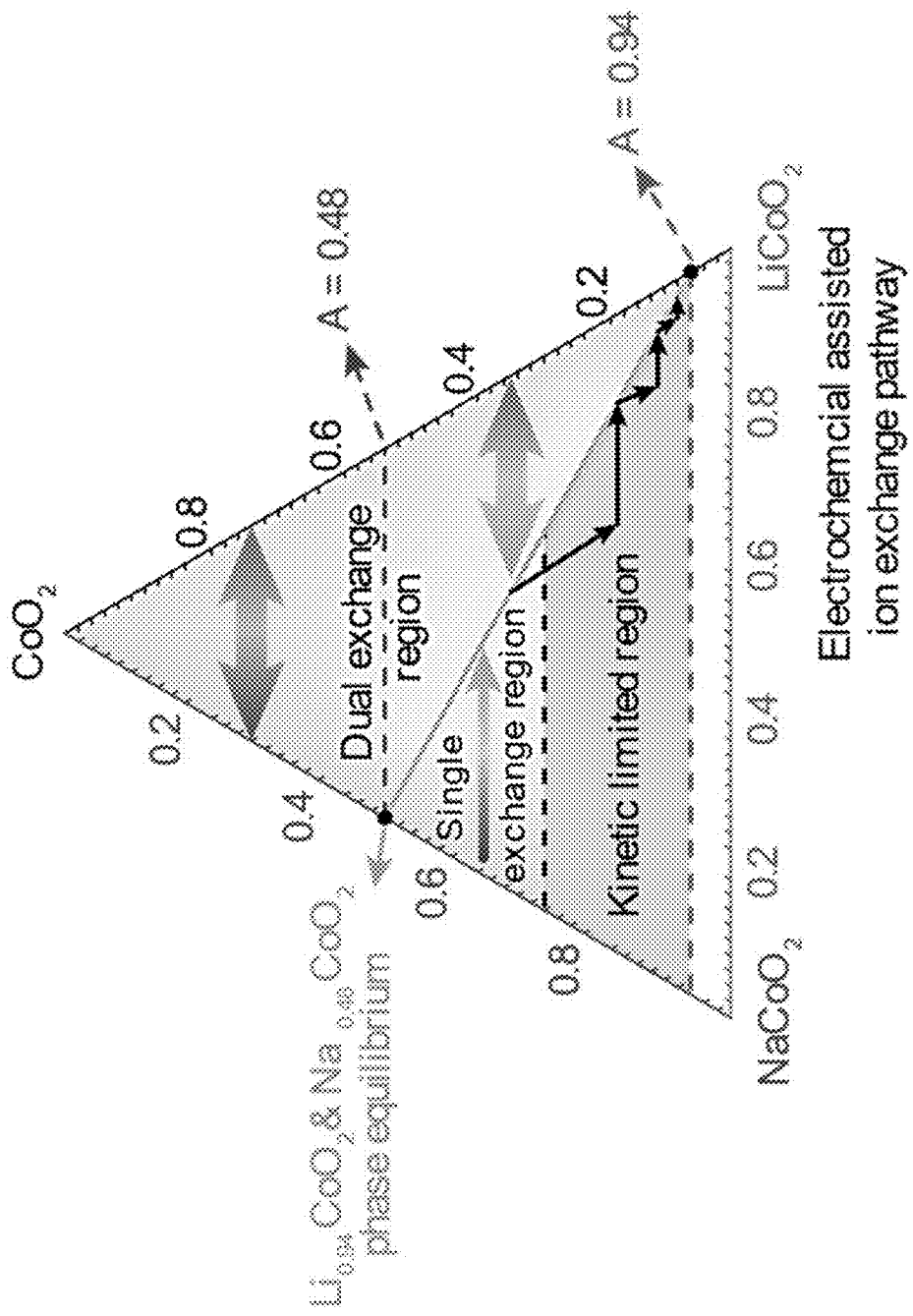
FIG. 5 shows a phase diagram of Li and Na interchange in layered cobalt oxides. Two-phase equilibrium between $Li_{0.94}CoO_2$ and $Na_{0.48}CoO_2$ divides the whole cation range into two different regions. In the region above the equilibrium line, dual ion exchange between $Li_xCoO_2$ and $Na_y$-$CoO_2$ (y=x) or $Li_xCoO_2$ and $Li_aNa_bCoO_2$ (equilibrium composition) can be achieved. In the region below the equilibrium line, only $Na_yCoO_2$ exchanging with Li can be approached due to the strong structural Li preference. The kinetic barrier in this single exchange region is extremely large when the vacancy level is inadequate (A>0.72, A=a+b in $Li_aNa_bCoO_2$). The electrochemical assisted ion exchange pathway is highlighted with black arrows. The thickness of the shaded arrows indicates the driving force of the targeted ion in solutions (e.g. $Na_yCoO_2$ exchange with 1-1000 Li—Na and 1 M Li are shown by thin and thick arrows, respectively.).
Figure 6A:
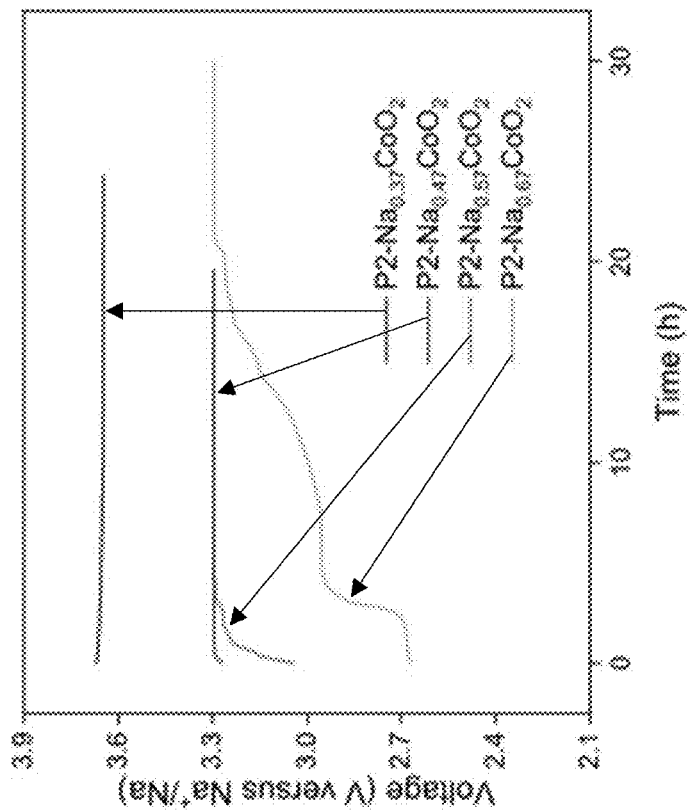
FIGS. 6A-6D show phase separation and two-phase equilibrium $Li_{0.94}CoO_2$—$Na_{0.46}CoO_2$ exist in P2-$Na_yCoO_2$ exchange with 1-1000 Li—Na.
Figure 6B:
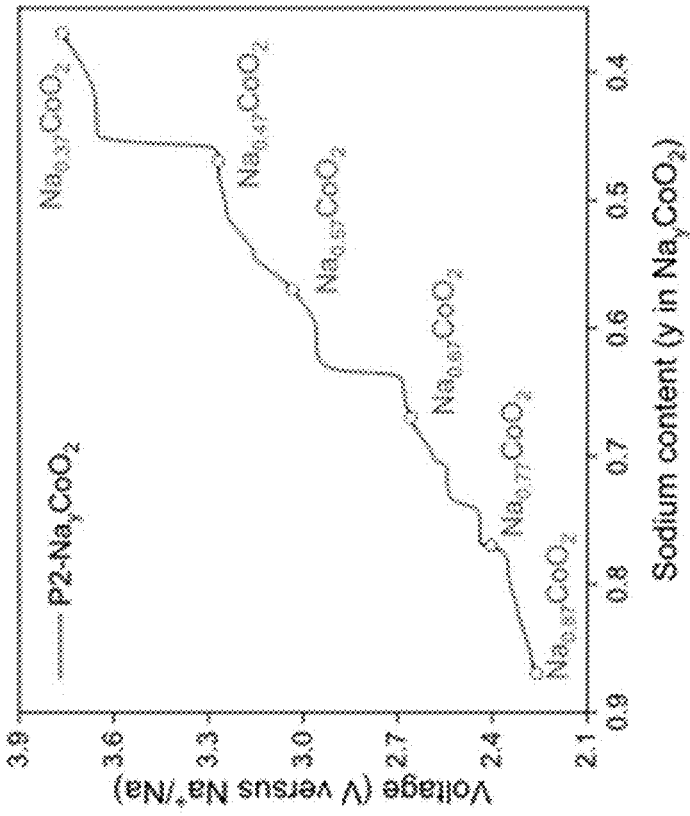
Figure 6C:
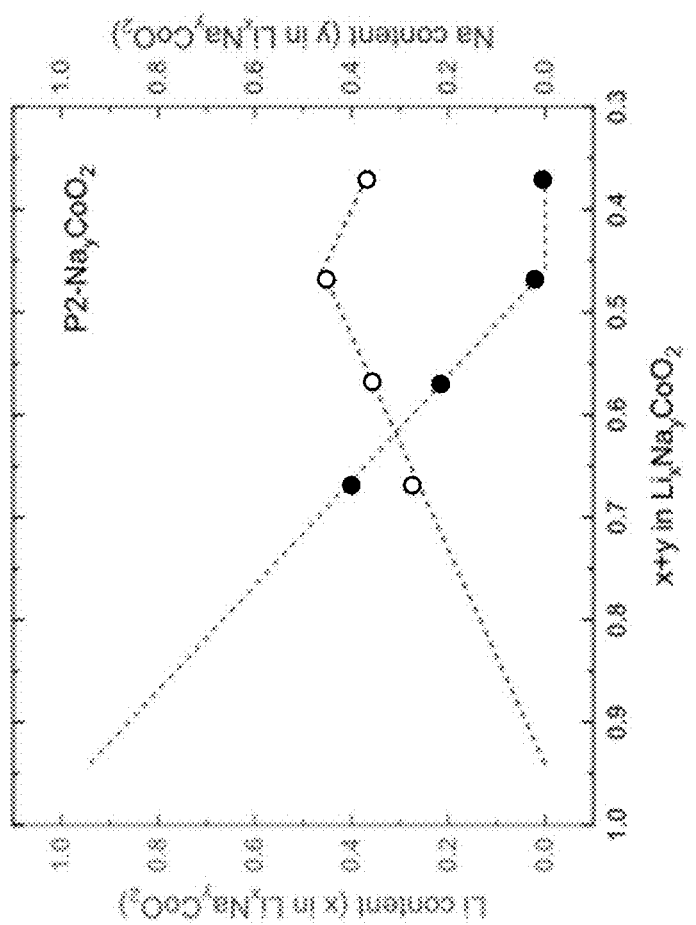
Figure 6D:
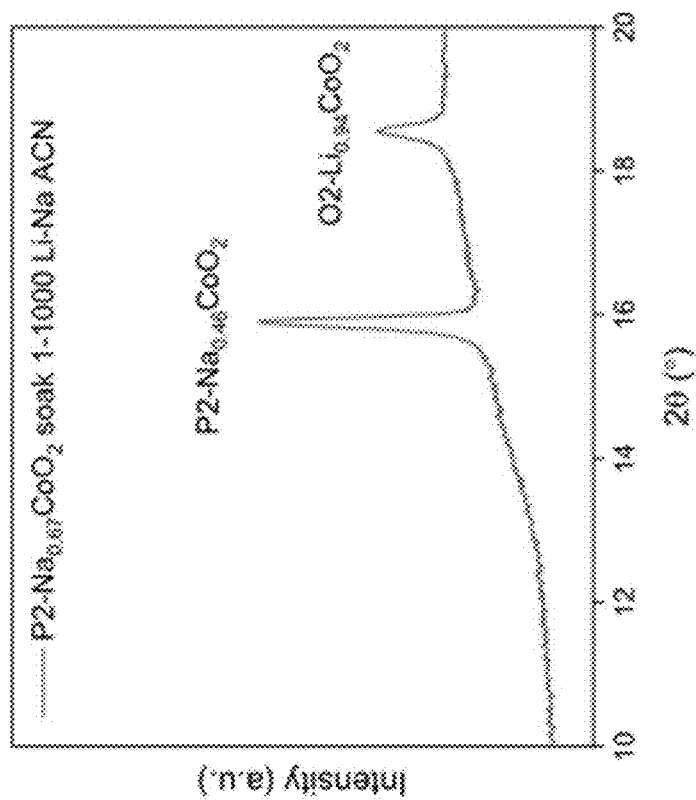

Finally, all the accessible conversion pathways for Li and Na ion exchange in layered cobalt oxide were labeled (FIG. 5). All $Li_xCoO_2$ can be achieved from Li exchanging with $Na_yCoO_2$ given sufficient driving force and avoiding the kinetic-limited regions. However, only $Na_yCoO_2$ with $y < 0.48$ can be achieved at large Na concentrations and excesses due to the extremely strong structural Li preference. These results indicate that the phase equilibrium between $Li_{0.94}CoO_2$ and $Na_{0.48}CoO_2$ plays a key role in determining the ion exchange pathway in all cation ranges.

This Example also showed that vacancy-dependent large thermodynamic Li preference can trigger the exchange of $Na_yCoO_2$ at an extremely low Li ratio (e.g. 1-10000) and small excess. This Example resolved general ion exchange pathways that $Li_{0.94}CoO_2$ nucleation initiated the ion exchange and were followed by surface reaction-limited and diffusion-limited exchange pathways at near equilibrium (e.g. 1-1000) and far from the equilibrium (e.g. 1 M Li) conditions, respectively. Guided by the understanding of the ion exchange mechanism, $Na_yCoO_2$ conversion from the parent $Li_xCoO_2$ was demonstrated for the first time, and $Na_yCoO_2$ conversion to $Li_{0.94}CoO_2$ was realized via electrochemical assisted ion exchange. This work opens new opportunities for ion exchange in predictive synthesis and Li extraction.

Methods

Sample Preparation

P3-$Na_{0.67}CoO_2$ and P2-$Na_{0.67}CoO_2$ were synthesized via a known solid-state method. (Lei, Y. et al., *Chem. Mater.* 26, 5288-5296 (2014).) $Na_2O_2$ (Alfa, 95%) and $Co_3O_4$ (Alfa, 99.7%) were mixed in a stoichiometric ratio of Na:Co=0.68:1 (a slight excess of Na) in an Ar glovebox. 30 min high-energy ball-milling was treated before pressing the mixture into a pellet. The transferring step from the ball-milling container to the press dies was finished in the Ar glovebox as well to minimize air contact. The pellet was heated at 535° C. for 16 h to obtain P3-$Na_{0.67}CoO_2$ and at 700° C. for 16 h to obtain P2-$Na_{0.67}CoO_2$. After cooling down to ~300° C., the pellet was transferred into the Ar glovebox and stored for later use. Electrode slurries were prepared by mixing the active material, conductive carbon (Super P, MTI), and binder (polyvinylidene fluoride, MTI) in an 8:1:1 weight ratio, together with N-methyl-2-pyrrolidone (NMP, Sigma-Aldrich). The mass loading was 2-3 mg per electrode. Electrodes were made by coating slurries on the carbon cloth substrate.

Electrochemical Test

All the electrochemical tests (including the OCV tests) were conducted in the three-electrode system using SP-300 potentiostat (BioLogic) in the Ar glovebox. The potential for the commercial $LiCoO_2$ in 1 M Li ACN charging is around 0.6 V versus the non-aqueous $Ag^+$/Ag reference electrode (CH Instrument Inc.). Therefore, the potential of the reference electrode is around 3.0 V versus Ne/Na. All the plotted curves were manually shifted 3.0 V for better comparison. The counter electrodes $LiFePO_4$, $NaFePO_4$, or $FePO_4$ were chosen depending on the major cation in electrolytes. Electrolytes were prepared by dissolving $LiClO_4$ and (or) $NaClO_4$ into 30 mL acetonitrile (CAN) according to different ratios. 500 mL 1-10000 Li—Na CAN was used for validating the electrochemical assisted ion exchange method. C/80 was used for collecting the galvanostatic curves of P3-$Na_yCoO_2$ and P2-$Na_yCoO_2$. C/40 and C/10 were used to prepare NayCoO2 electrodes and $Li_xCoO_2$ electrodes with different vacancies, respectively. C/10 was used in the electrochemical assisted ion exchange process.

$Li_{0.94}CoO_2$ and $Na_{0.48}CoO_2$ Phase Assignment

The newly appeared Li peak position matched well with $Li_{0.94-1.0}CoO_2$. (Ménétrier, M. et al., *Journal of Materials Chemistry* 9, 1135-1140 (1999).) Considering the low electronic conductivity of $Li_xCoO_2$ at $0.94 \leq x \leq 1$, which will induce a high energy barrier for Li insertion during ion exchange in a low Li—Na ratio solution, the newly appeared Li phase was assigned to $Li_{0.94}CoO_2$ instead of $Li_{1.0}CoO_2$. (Ménétrier, M. et al., 1999; Dahéron, L. et al. *Chem. Mater.* 20, 583-590 (2008).) The new Na phase had an interlayer distance of 5.55 Å, which corresponds to $Na_yCoO_2$ at $0.3<y<0.5$. (Viciu, L. et al. *Phys. Rev. B* 73, 174104 (2006).) The galvanostatic curve (FIG. 1A) gave y=0.48 based on the final voltage, which was also confirmed by inductively coupled plasma mass spectrometry (ICP-MS).

$$(1-x)f+(1-y)(1-f)=c, \text{ Equilibrium Equation and Evolution Equation}$$

where x is the Li component in the Li phase $Li_xCoO_2$, x=0.94 for the equilibrium condition and during evolution; y is the Na component in the Na phase $Na_yCoO_2$, y=0.48 for the equilibrium condition and $0.48<y<0.67$ during evolution; f is the phase fraction of the Li phase; c is the total vacancy in the structure. The Li content a, and Na content b in the structure $Li_aNa_bCoO_2$ (a, b are different than x, y in equilibrium Li and Na phases) after reaching equilibrium can be calculated by $a=x\times f$ and $b=y\times(1-f)$. During evolution, Na components y (y=0.64, 0.565, and 0.50 at plateau I, II, and IV, respectively) are determined via coulomb counting by comparing the plateau voltages of OCV curves and that of the galvanostatic curve (FIG. 1A).

Structural Selectivity

The structural selectivity is calculated based on the final composition $Li_aNa_bCoO_2$ versus the Li—Na ratio in the system as (a/b)/ratio.

The Calculation of the Excess Amount of Li

The Li amount provided in 30 mL 1-1000 Li—Na ACN solution was 0.03 mmol. The exchanged Li amount in the 3 mg electrode with a final composition of $Li_{0.90}Na_{0.02}CoO_2$ was 0.0254 mmol. The excess amount of Li was calculated as 18%.

X-Ray Diffraction

Synchrotron XRD measurements (0.1173 Å) were conducted at the 13-BM beamline of Advanced Photon Source. Intensities in FIG. 1C and FIG. 2B have been normalized to make the strongest diffraction peaks have the same intensity. X-ray diffractions of $P2-Na_2CoO_2$, converted $Li_{0.90}Na_{0.02}CoO_2$, and converted $Na_yCoO_2$ were collected by using Rigaku MiniFlex 600 with a Cu Kα source. The Rietveld refinements were carried out using GSAS II. The instrument parameters were modified based on the "defaults for APS 30 KeV 11 BM". Diffractions of single-phase $Na_{0.57}CoO_2$ and $Na_{0.67}CoO_2$ were first refined based on literatures. (Viciu, L. et al., 2006; Ono, Y. et al. *Journal of Solid State Chemistry* 166, 177-181 (2002).) The unit cell and atom coordination were refined. The obtained phase information as the reference was used for refining biphasic diffractions. Phase fraction was added for the biphasic diffraction refinement.

Scanning Transmission Electron Microscopy (STEM)

The top-view of equilibrium particles showing Li—Na phase separation and atomic-resolution images of the fully converted $Li_{0.90}Na_{0.02}CoO_2$ were conducted by using the aberration-corrected scanning transmission electron microscope (STEM) JEOL ARM200CF at the University of Illinois at Chicago. The HAADF detector angle was 90-270 mrad to give Z contrast images. The low-angle annular dark-field detector angle ranged between 40 and 120 mrad. The energy dispersion for EELS (Gatan) was 0.15 eV/pixel with 0.1 s per pixel dwell time. EDS spectra imaging was acquired using an Oxford X-Max 100TLE windowless SDD detector. The cross-section views of the fully converted $Na_{0.48}CoO_2$ were conducted using the aberration-corrected scanning transmission electron microscope (STEM) JEOL ARM200CF at Northwestern University. EDS spectra imaging was acquired using a Dual SDD EDS detector.

Particles were removed from the electrodes after reaching the equilibrium by sonication and were drop-cast onto lacey carbon membrane-coated gold grids for top-view imaging. For the cross-section view imaging of the converted $Li_{0.90}Na_{0.02}CoO_2$, after removing from the electrodes, particles were embedded into Poly/Bed 812 resin and cut into 90 nm thick slides using a ultramicrotome (Ultracut E, Reichert-Jung). For the cross-section view imaging of the converted $Na_{0.48}CoO_2$, micron-sized particles were removed from the electrodes, which were site-specifically cut and thinned using conventional focused ion beam scanning electron microscopy (FIB-SEM, FEI Helios NanoLab 600). Specifically, a ~150 nm thick carbon layer and ~1.2 μm thick platinum layer were initially deposited using a gas injection system (GIS) to protect the surface of the target particle. After removal of an approximately 8×2×4 μm section via in-situ lift-out using a W micromanipulator (Oxford Omniprobe 200), the lamella was thinned at initially 30 kV, 0.49 nA, and subsequently at 5 kV, 81 pA. Finally, the sample was cleaned at 2 kV and 28 pA to yield a ~90 nm thick lamella.

Scanning Electron Microscopy (SEM)

Scanning electron micrographs were obtained on a Zeiss Merlin scanning electron microscope using a 20 kV accelerating voltage. EDS spectra imaging was acquired using an Oxford Ultim Max 100 EDS detector.

Inductively Coupled Plasma Mass Spectrometry (ICP-MS)

3% $HNO_3$ (aq) was used as the diluting matrix, and all the measurements used either Thermo iCAP Q ICP-MS or Thermo iCAP RQ ICP-MS.

Before dissolving, each electrode was washed at least 6 times with 10 mL ACN solution each time to remove residual salts on the surface as completely as possible. 8 mL aqua regia was used to dissolve each electrode.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can be mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for synthesizing a layered oxide having the formula $Li_xNa_yMO_2$, where $0<x<1$ and $0<y<1$ and M is Co, Mn, or Ni, the method comprising:
   (a) providing a layered sodium metal oxide having the formula $Na_yMO_2$, where $0.57\leq y\leq 0.67$;
   (b) conducting a first cation-exchange on the $Na_yMO_2$, where $0.57\leq y\leq 0.67$, in a solution containing dissolved lithium ions to convert the $Na_yMO_2$, where $0.57 \leq y \leq 0.67$, into a material comprising discrete phases of $Li_{0.94}MO_2$ and $Na_yMO_2$, where $0.45<y<0.51$;

(c) conducting an electrochemical intercalation of lithium ions into the material to increase a $Li_{0.94}MO_2$ fraction in the material and regenerate $Na_yMO_2$, where $0.57 \leq y \leq 0.67$; and (d) conducting an additional cation-exchange on the material in the solution containing dissolved lithium ions to increase the $Li_{0.94}MO_2$ fraction in the material and convert the $Na_yMO_2$, where $0.57 \leq y \leq 0.67$, back into $Na_yMO_2$, where $0.45<y<0.51$.

2. The method of claim 1, further comprising repeating steps (c) and (d) two or more times.

3. The method of claim 2, comprising repeating steps (c) and (d) until the $Li_{0.94}MO_2$ fraction in the material is at least 90 mol %.

4. The method of claim 1, wherein the solution containing dissolved lithium ions comprises a mixture of dissolved lithium ions and dissolved sodium ions and the dissolved sodium ions are present in excess.

5. The method of claim 1, wherein the solution containing dissolved lithium ions has a lithium ion concentration of 1 mM or lower.

6. The method of claim 1, wherein the solution containing dissolved lithium ions has a lithium ion concentration of 0.2 mM or lower.

7. The method of claim 1, wherein M is Co.

8. The method of claim 1, wherein M is Mn.

9. The method of claim 1, wherein M is Ni.

10. A method for synthesizing a layered oxide having the structure $Na_yMO_2$, where $0.45<y<0.51$ and M is Co, Mn, or Ni, the method comprising:

providing a layered lithium metal oxide having the structure $LiMO_2$;

conducting an electrochemical deintercalation of lithium ions from the layered lithium metal oxide to convert the $LiMO_2$ into $Li_{0.4}MO_2$; and conducting a cation-exchange on the $Li_{0.4}MO_2$ in a solution containing dissolved sodium ions to convert the $Li_{0.4}MO_2$ into a material comprising $Na_yMO_2$ phases, where $0.45<y<0.51$, wherein a phase fraction of $Na_yMO_2$ in the material is at least 0.98 mol. %.

11. The method of claim 10, wherein M is Co.

12. The method of claim 10, wherein M is Mn.

13. The method of claim 10, wherein M is Ni.

14. The method of claim 2, comprising repeating steps (c) and (d) until the $Li_{0.94}MO_2$ fraction in the material is at least 95 mol %.

15. The method of claim 1, wherein the $Na_yMO_2$ on which the first cation-exchange is conducted comprises P2-$Na_{0.67}MO_2$.

16. The method of claim 1, wherein the $Na_yMO_2$ on which the first cation-exchange is conducted comprises P3-$Na_{0.67}MO_2$.

* * * * *